US011906132B2

(12) United States Patent
Hierzer

(10) Patent No.: US 11,906,132 B2
(45) Date of Patent: Feb. 20, 2024

(54) LIGHTING ARRANGEMENT HAVING ASSEMBLY OF LIGHTING MODULE FOR DIRECT LIGHTING OR INDIRECT LIGHTING, AND/OR ASSEMBLY OF CONNECTING UNIT AND RAIL THAT COUPLES OR ACCOMMODATES AT LEAST ONE LIGHTING UNIT, AND A RAIL PROFILE ACCOMMODATING AN ADAPTER UNIT THAT ELECTRICALLY COUPLES THE ASSEMBLY

(71) Applicant: H4X e.U., Graz (AT)

(72) Inventor: Andreas Hierzer, Graz (AT)

(73) Assignee: H4X E.U., Graz (AT)

( * ) Notice: Subject to any disclaimer, the term of this patent is extended or adjusted under 35 U.S.C. 154(b) by 0 days.

(21) Appl. No.: 17/703,504

(22) Filed: Mar. 24, 2022

(65) Prior Publication Data

US 2022/0307662 A1 Sep. 29, 2022

(30) Foreign Application Priority Data

Mar. 25, 2021 (DE) ......................... 102021202972.8

(51) Int. Cl.
*F21S 8/06* (2006.01)
*F21S 8/04* (2006.01)
(Continued)

(52) U.S. Cl.
CPC ............... *F21S 8/066* (2013.01); *F21S 6/008* (2013.01); *F21S 8/043* (2013.01); *F21V 21/005* (2013.01);
(Continued)

(58) Field of Classification Search
CPC .. F21S 8/043; F21S 8/066; F21S 6/007; F21S 6/008; F21V 23/008; F21V 21/005;
(Continued)

(56) References Cited

U.S. PATENT DOCUMENTS 5,672,003 A 9/1997 Shemitz et al.
9,845,942 B2 12/2017 Ladstaetter
(Continued)

FOREIGN PATENT DOCUMENTS

CN 211010946 U 7/2020
CN 211694555 U 10/2020
(Continued)

OTHER PUBLICATIONS

ERCO GmbH, “Device For Connecting A Lamp To Be Operated With A Low-Voltage Operating Voltage To A High-Voltage Busbar”, Feb. 27, 2020, Clarivate Analytics, Original document merged with English translation text of DE 202018106674 U1, pp. 1-23. (Year: 2020).*

(Continued)

*Primary Examiner* — Alan B Cariaso
(74) *Attorney, Agent, or Firm* — Millen, White, Zelano & Branigan P.C.; William F. Nixon

(57) ABSTRACT

A lighting arrangement includes an assembly, a rail profile, and an adapter unit. The assembly is designed as a lighting module or lighting unit coupled to the assembly or accommodated by the assembly. The rail profile has a first region for accommodating the assembly and a second region, in which a conductor device for providing electrical energy is provided along the rail profile. The adapter unit is accommodated in the second region of the rail profile and is configured to be electrically coupled to the conductor device in the second region, to receive electrical energy from the conductor device and to provide electrical energy to the assembly for supplying the lighting module or the lighting unit. The adapter unit and the assembly are configured for electrical coupling so that the assembly displaces along a longitudinal direction of the rail profile relative to the adapter unit inserted into the second region.

24 Claims, 20 Drawing Sheets

(51) Int. Cl.

| | |
|---|---|
| ***F21V 21/34*** | (2006.01) |
| ***F21V 23/00*** | (2015.01) |
| ***F21V 21/005*** | (2006.01) |
| ***F21V 23/06*** | (2006.01) |
| ***F21V 21/35*** | (2006.01) |
| ***F21S 6/00*** | (2006.01) |
| ***H01R 25/14*** | (2006.01) |
| ***F21V 21/02*** | (2006.01) |
| ***H01R 13/71*** | (2006.01) |
| *F21Y 115/10* | (2016.01) |
| *F21Y 103/10* | (2016.01) |

(52) U.S. Cl.
CPC ............ *F21V 21/025* (2013.01); *F21V 21/34* (2013.01); *F21V 21/35* (2013.01); *F21V 23/002* (2013.01); *F21V 23/008* (2013.01); *F21V 23/06* (2013.01); *H01R 25/142* (2013.01); *F21Y 2103/10* (2016.08); *F21Y 2115/10* (2016.08); *H01R 13/71* (2013.01); *H01R 25/145* (2013.01)

(58) Field of Classification Search
CPC .......... F21V 21/34; F21V 21/35; F21V 23/06; F21V 23/007; F21V 21/025; F21V 23/002; F21V 23/009; H01R 25/142; H01R 25/145; H01R 13/71
See application file for complete search history.

(56) References Cited

U.S. PATENT DOCUMENTS

| | | | |
|---|---|---|---|
| 10,174,923 | B2 | 1/2019 | Sonneman |
| 11,098,884 | B2 | 8/2021 | Machate |
| 2006/0039168 | A1 | 2/2006 | Mier-Langner et al. |

FOREIGN PATENT DOCUMENTS

| | | | | |
|---|---|---|---|---|
| DE | 9111003 | U1 | | 12/1991 |
| DE | 102009037764 | A1 | | 2/2011 |
| DE | 102011017702 | A1 | | 10/2012 |
| DE | 202018100522 | U1 | | 5/2019 |
| DE | 202018106674 | U1 | * | 4/2020 |
| EP | 3719394 | A1 | | 10/2020 |
| WO | 2020235807 | A1 | | 11/2020 |

OTHER PUBLICATIONS

Office Communication for related German Patent Application No. 102021202972 dated Dec. 8, 2021.

English Abstract of DE-102009037764, Publication Date: Feb. 24, 2011.

Office Action in corresponding AT50240/2021 dated Jun. 15, 2022 (1 page).

Search Report in corresponding EP 22 16 4229 dated Jul. 7, 2022 (pp. 1-2).

* cited by examiner

LIGHTING ARRANGEMENT HAVING ASSEMBLY OF LIGHTING MODULE FOR DIRECT LIGHTING OR INDIRECT LIGHTING, AND/OR ASSEMBLY OF CONNECTING UNIT AND RAIL THAT COUPLES OR ACCOMMODATES AT LEAST ONE LIGHTING UNIT, AND A RAIL PROFILE ACCOMMODATING AN ADAPTER UNIT THAT ELECTRICALLY COUPLES THE ASSEMBLY

FIELD OF THE INVENTION

The invention relates to lighting arrangements having a rail profile or a rail, in particular for lighting purposes in buildings, e.g. interior spaces thereof.

TECHNICAL BACKGROUND

Lighting arrangements based on rail systems, for instance for lighting purposes in buildings, are already known. For example, systems have already been proposed, in which electrical conductors are integrated into a rail profile to provide a supply voltage and control signals. Such rail systems include e.g. a number of light insets of a different type, e.g. spotlights or linear light insets, which can also be combined.

Furthermore, e.g. EP 3 336 420 B1 describes a lighting system which comprises a channel for receiving a lighting unit which can be inserted therein. A connector which can be inserted into the channel is designed to electrically couple conductor rail sections to one another. In the state inserted into the channel, the lighting unit and the connector can be arranged in an overlapping manner within the channel.

EP 3 495 726 A1 describes a lighting device having a connecting body which can be mechanically and electrically connected to a guide and which can be inserted into and removed from the guide at least in a direction perpendicular to the longitudinal extension of the guide.

Furthermore, e.g. EP 3 217 090 B1 describes an adapter which is intended to support a lighting device and electrically connect it to an electrified rail.

Furthermore, EP 3 719 394 A1 describes a lighting apparatus having a light and an adapter. The adapter serves to connect the light to a rail as a support. A connecting section of the adapter has a displacement element which can be connected in a displaceable manner to the rail serving as a support. The light has, for its part, a guide rail with first electrical contacts, while the adapter has a carriage with second electrical contacts, which is connected in a displaceable manner to the guide rail. An intermediate section is provided between the carriage and the connecting section and defines a pivot joint between the carriage and the connecting section.

Although such conventional rail systems already offer an advantageous, high degree of flexibility in the design of a lighting solution adapted to individual circumstances, it has been shown that in the design and structure of such lighting arrangements, an improvement in flexibility would be desirable with a nevertheless relatively simple and cost-effective structure.

SUMMARY OF THE INVENTION

Against this background, the object of the invention is that of proposing a lighting arrangement which offers improved flexibility and at the same time is comparatively simple and economical in design.

This object is achieved in accordance with the invention by a lighting arrangement having the features of claim 1.

A lighting arrangement is proposed, comprising:

an assembly which is designed as a lighting module or to which at least one lighting unit can be coupled and/or by means of which at least one lighting unit can be accommodated at least partially;

a rail profile having a first region for accommodating the assembly at least partially and having a second region, in which a conductor device for providing at least electrical energy is provided along the rail profile; and an adapter unit which can be accommodated in the second region of the rail profile at least partially and is configured to be electrically coupled to the conductor device in the second region, to receive electrical energy from the conductor device and to provide electrical energy to the assembly for supplying the lighting module or the lighting unit.

In this case, the adapter unit and the assembly are configured for electrical coupling to one another in such a way that the assembly can be displaced along a longitudinal direction of the rail profile relative to the adapter unit inserted into the second region of the rail profile.

A concept addressed by the invention is to further increase the flexibility and versatility in the structure of the lighting arrangement in that, on the one hand, the adapter unit can be accommodated by the rail profile at a selectable position along the rail profile and, on the other hand, the assembly which provides the illuminating components or is provided for coupling or accommodating same can also be varied in its position along the profile rail relative to the adapter unit. Therefore, it is possible particularly for smaller position adjustments to avoid displacing the adapter unit and/or to release the coupling of the adapter unit to the conductor device. This can be additionally useful e.g. if the conductor device carries, by way of example, an electrical mains voltage, while the illuminating components are operated e.g. at low voltage. Thus, according to one aspect, additional clearance is created with regard to the positioning of the assembly and positioning is also facilitated. Accommodating the assembly at least partially in the first region of the rail profile can contribute to limiting the complexity of the design, in particular e.g. with regard to holding the assembly.

Advantageous embodiments and developments of the invention are apparent from the further dependent claims and from the description with reference to the figures.

In one embodiment, the assembly is provided for the provision of direct lighting or for the provision of indirect lighting. In this way, the lighting arrangement can be useful for many applications.

Furthermore, in one embodiment the lighting arrangement has at least one further assembly. In this case, the further assembly is designed as a lighting module, or at least one lighting unit can be coupled to the further assembly and/or at least one lighting unit can be accommodated at least partially by the further assembly. In this case, the assembly and the further assembly are configured for electrical coupling to each other in such a way that the further assembly can be supplied via the assembly at least with electrical energy provided by the adapter unit.

According to one development, the assembly is designed as a linear lighting module, e.g. an elongated lighting module. Such lighting modules can be used e.g. to form light bands which provide expedient and aesthetic lighting in smaller and larger rooms.

In one embodiment, the assembly has strip-like contact elements on a side thereof facing the adapter unit when the adapter unit and the assembly are inserted into the rail profile. In this case, the strip-like contact elements can be brought into electrically conductive contact with allocated contact elements of the adapter unit. In particular, the strip-like contact elements extend with their longitudinal direction along the longitudinal direction of the rail profile when the assembly is in the inserted state. In this way, the displaceable electrical coupling of adapter unit and assembly can be achieved relatively easily. Not only the coupling, but also the disengagement of the releasable electrical coupling can be effected quickly and easily by a fitter or operator with little effort.

In one development, the contact elements of the adapter unit are designed as punctiform contact elements, in particular as pin-like or pin-head-like contact elements. The contact elements can thus be designed in a relatively compact and material-saving manner on the adapter unit, and can be arranged in a space-saving manner.

In one embodiment, the assembly has a double-sided printed circuit board, wherein the strip-like contact elements are formed as tracks on a main surface of the printed circuit board. Such contact elements can be expediently produced.

In particular, the double-sided printed circuit board can be further provided with light-generating devices, e.g. LEDs, on its other main surface. In particular, the functions of light generation and establishing contact with the adapter unit can thus be combined on the printed circuit board. In addition, space and installation outlay can be saved in this way.

In a further embodiment, the assembly is formed with a rail for coupling and/or accommodating the lighting units at least partially. This allows additional flexibility by combining the rail profile with the rail of the assembly. Flexibility and design freedom can be further increased by coupling and/or accommodating one or more lighting units on or in the rail.

According to one development, the rail of the assembly has a passage-opening in the region of a web of the rail facing the adapter unit when the adapter unit and the assembly are inserted into the rail profile. In this development, the assembly further comprises a connecting unit which can be inserted into the rail of the assembly, wherein the connecting unit has a contacting section and the contacting section can be introduced into the passage-opening in order to effect the electrical coupling of the assembly to the adapter unit. In this way, the electrical coupling of adapter unit and assembly can be achieved in a simple way, quickly and with little effort. The passage-opening can be pre-produced, e.g. when the rail is in the delivery state, or can be flexibly inserted on the construction site.

In one development, an outer contour of the contacting section can be formed to correspond substantially to a shape of the passage-opening. Thus, the passage-opening can be substantially closed e.g. by the contacting section after insertion thereof.

In one embodiment, the connecting unit is configured to feed at least electrical energy provided by the adapter unit into a conductor device of the rail of the assembly. In particular, the connecting unit can be mechanically latchable to the rail of the assembly or clippable into the rail of the assembly. Thus, the electrical coupling of the adapter unit and the conductor device of the rail is achieved in a simple, reliable and preferably releasable manner and with little effort and time required. The provision of electrical energy for lighting units which are coupled to or accommodated by the rail of the assembly is achieved in a simple, reliable manner.

According to one development, the adapter unit has strip-like contact elements on a side facing the assembly when the adapter unit and the assembly are inserted into the rail profile, which can be brought into electrically conductive contact with contact elements of the assembly. In particular, the strip-like contact elements extend with their longitudinal direction along a longitudinal direction of the rail profile when the adapter component is in the inserted state. Also, with this development a displaceable electrical coupling of the adapter unit to the assembly is achieved in a simple manner, wherein the coupling can be easily established and preferably also easily disengaged.

According to one development, the contact elements of the assembly are designed as punctiform contact elements, in particular as pin-like or pin-head-like contact elements. In this manner, the contact elements can be designed in a relatively compact and material-saving manner on the assembly, and can be arranged in a space-saving manner.

In particular, the contact elements of the assembly are arranged on the contacting section of the connecting unit which can be inserted into the rail of the assembly. This makes a comparatively compact contacting section possible.

In one embodiment, the conductor device provided in the second region of the rail profile is further configured to provide a control signal, wherein the adapter unit is configured to receive the control signal from the conductor device and to interpret the received control signal, and the adapter unit is configured, on the basis of the received control signal, to form an output signal to be transmitted to the assembly for controlling the assembly and/or to control the assembly based on the control signal. In particular, the electrical coupling of the adapter unit and the assembly is configured for transmitting the output signal, to be transmitted, to the assembly and/or for controlling the assembly based on the control signal.

In one embodiment, provision is made that the assembly is designed as a lighting module and that the lighting arrangement further has at least one further assembly designed as a lighting module. In this case, provision is made that the assembly and the further assembly are configured to further transmit the output signal, which is transmitted by the adapter unit to the assembly for the control thereof, to the further assembly for the control thereof and/or that the assembly and the further assembly can be controlled together according to a master-slave principle, wherein the further assembly as slave is subordinate to the assembly as master, and in particular the further assembly as slave can be controlled in the same way as the assembly as master. In this way, two or more lighting modules can be activated and supplied together via one adapter unit. If a plurality of lighting modules are to be controlled in the same way, it is therefore not necessary to provide a separate adapter unit for each of the lighting modules. Lighting modules which are to be controlled separately can nevertheless each be coupled to a specifically allocated adapter unit. Thus, a high degree of flexibility is achieved.

In particular, the further lighting module can likewise be designed as a linear lighting module.

In one embodiment, the conductor device provided in the second region of the rail profile is configured to provide a control signal, wherein the adapter unit is configured to pick up the control signal from the conductor device and relay it to the assembly. This can be particularly advantageous if the assembly comprises a rail for coupling and/or accommodating one or more lighting units. The control signal which is relayed by the adapter unit in this embodiment, preferably unchanged, to the assembly can thus be made available to each of the lighting units coupled to the rail and/or accommodated thereby, thus enabling single, individual control of these lighting units.

In one development, the assembly and the further assembly are each designed having a rail for coupling and/or accommodating lighting units at least partially and can be coupled to one another in such a way that the control signal relayed to the assembly via the adapter unit can be relayed to the further assembly.

In one embodiment, the first region is formed as a first region of the rail profile at the rear side when the lighting arrangement is in the state of use. In this case, the rear-side first region is provided for accommodating, at least partially, an assembly designed as an indirect lighting module, the rear-side first region and the second region are formed adjacent to one another and are delimited from one another by a web of the rail profile, and the rail profile has a passage-opening in the region of the web. The adapter unit has a contacting section on a side facing the web in a state of the adapter unit inserted into the rail profile, which contacting section can be introduced into the passage-opening in order to bring about the displaceable electrical coupling of the indirect lighting module to the adapter unit. By introducing and guiding the contacting section into and through the passage-opening of the web, a considerably simplified supply to the indirect lighting module can be achieved. The passage-opening can be pre-produced or inserted as required in the desired position during assembly of the lighting arrangement.

In one embodiment, the lighting module(s) or the lighting unit(s) for providing direct or indirect lighting can be operated by means of electrical energy at a first electrical voltage. The conductor device in the second region is provided in this case for providing the electrical energy at a second electrical voltage which is higher than the first electrical voltage, and the adapter unit has a converter and is configured to receive electrical energy from the conductor device in the second region and to provide the electrical energy for supplying the lighting module(s) or the lighting unit(s) at the first electrical voltage.

In one embodiment, the conductor device in the second region of the rail profile is designed to provide electrical alternating current at a current mains voltage, in particular a nominal electrical voltage of about 220 to about 240 volts, e.g. 230 volts. Furthermore, in this embodiment, the adapter unit is preferably designed to provide electrical current at a low voltage, in particular a direct voltage of less than 60 volts, e.g. 48 volts, for supplying the lighting module or the lighting unit(s) of the assembly.

According to one development, the conductor device provided in the second region of the rail profile has at least one conductor which is provided in order to carry a control signal, and the conductor device further has at least two conductors which each carry an electrical phase for the electrical supply to the lighting module or the lighting unit.

In one development, the adapter unit is configured to couple the assembly to the at least one conductor carrying the control signal and to an optional one of the phases for the supply of power. The coupling can be effected with or without the incorporation of an interpretation and/or processing of the control signal. The coupling to the supply of power can be effected in particular with the interposition of a converter. Further flexibility in the structure and operation of the lighting arrangement is thus created by the possibility of selecting the phase to be used.

In one embodiment, at least two times three conductors, e.g. two times three conductors or two times five conductors, are provided in the second region of the rail profile by means of the conductor device.

In an alternative embodiment, the rail profile can be designed as a low-voltage rail, wherein the conductor device in the second region is designed to provide electrical current at a low voltage, in particular a direct voltage of less than 60 volts, e.g. 48 volts, for supplying the lighting module of the assembly. In one such embodiment, the assembly can be designed in particular as an indirect lighting module. In the case of this variant, an improvement in flexibility in design and installation can likewise be achieved with the aid of the displaceable coupling.

In one embodiment, the adapter unit and the assembly are configured for electrical coupling to one another by means of cabling. In this case, the cabling can be formed in particular with a flexible cable. Such an electrical coupling by means of cabling can enable displaceability of the assembly relative to the adapter unit and at the same time can be implemented cost-effectively.

In one embodiment, the assembly can be mechanically coupled to the rail profile in the first region thereof. In this way, the assembly can be fastened in a simple way, and independently of the adapter unit. In particular, the assembly can be mechanically coupled to the rail profile in the first region in such a way that the assembly can be displaced relative to the rail profile when in the state coupled to the rail profile. Flexible correction of the position of the assembly while it is in the state of being held on the rail profile is thus possible and particularly advantageous in combination with the displaceable electrical coupling to the adapter unit.

For example, the assembly can be clipped into the rail profile or latched to the rail profile in such a way that the assembly can be displaced relative to the rail profile, in particular along the longitudinal direction of the rail profile.

In a further embodiment, the lighting arrangement may have a further adapter unit, to which a spotlight is fixedly connected and electrically coupled for supplying the spotlight, or which is formed having a coupling device, by means of which a spotlight can be fastened directly to the adapter unit and electrically coupled to the adapter unit for supplying the spotlight. Therefore, the lighting arrangement can be supplemented, if desired, with one or more spotlights or spot lamps in order to fulfil further lighting tasks.

In particular, provision can be made that the assembly is designed to provide direct lighting, e.g. as a lighting module for direct lighting or for coupling a lighting unit for direct lighting, or that the assembly is designed to provide indirect lighting, e.g. the lighting module is designed as an indirect lighting module.

In one embodiment, the lighting arrangement can have at the same time an assembly for direct lighting and an indirect lighting module, each with an allocated adapter unit. The lighting module or the lighting unit(s) of the assembly provided for direct lighting and the indirect lighting module are each operable at the first electrical voltage, in particular low voltage, for the emission of light.

In particular, the adapter unit can be freely inserted along the rail profile, wherein, if a contacting section is to be introduced into said passage-opening, the passage-opening is inserted in a corresponding position or a suitably positioned pre-produced passage-opening is selected.

The above embodiments and developments can be combined with each other in any manner if it is useful to do so. Further possible embodiments, developments and implementations of the invention also comprise non-explicitlymentioned combinations of features of the invention which have been described or will be described hereinafter with reference to the exemplified embodiments. In particular, in this regard a person skilled in the art will also add individual aspects as improvements or complements to the respective basic form of the present invention.

Furthermore, it should be noted that the embodiments and developments described above in connection with [lacuna] can likewise be applied to the use in accordance with the invention.

BRIEF DESCRIPTION OF THE DRAWINGS

The invention will be explained in more detail hereinafter with the aid of the exemplified embodiments shown in the schematic figures of the drawings. In the drawings.

Figure 1:
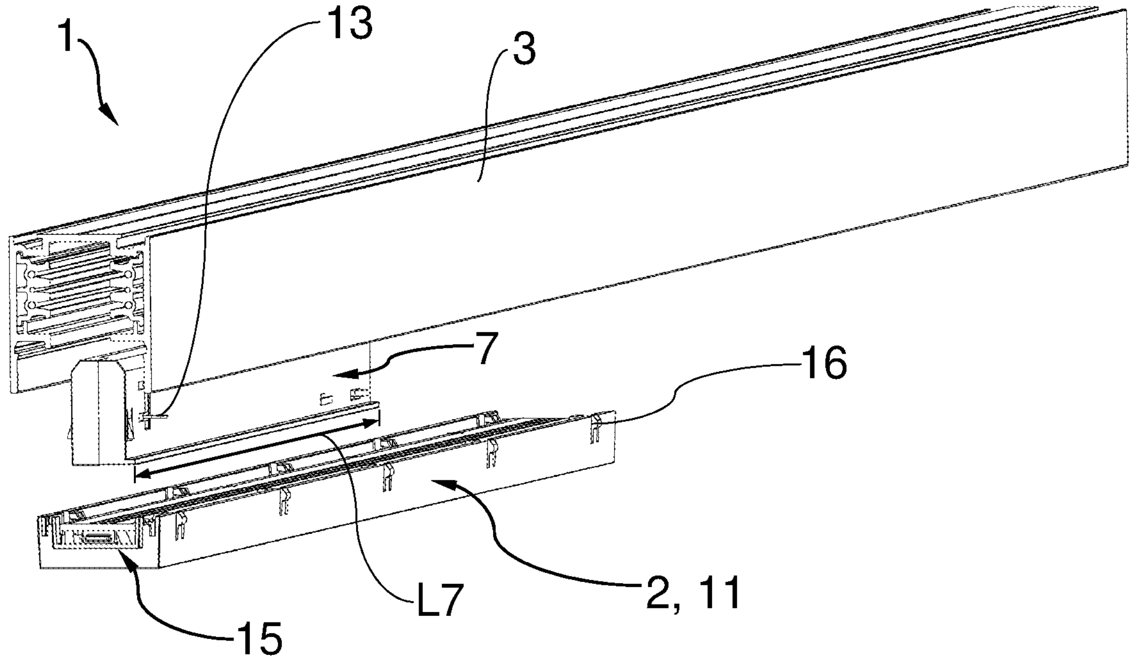
FIG. 1 shows a first perspective exploded view of a lighting arrangement according to a first exemplified embodiment.
Figure 2:
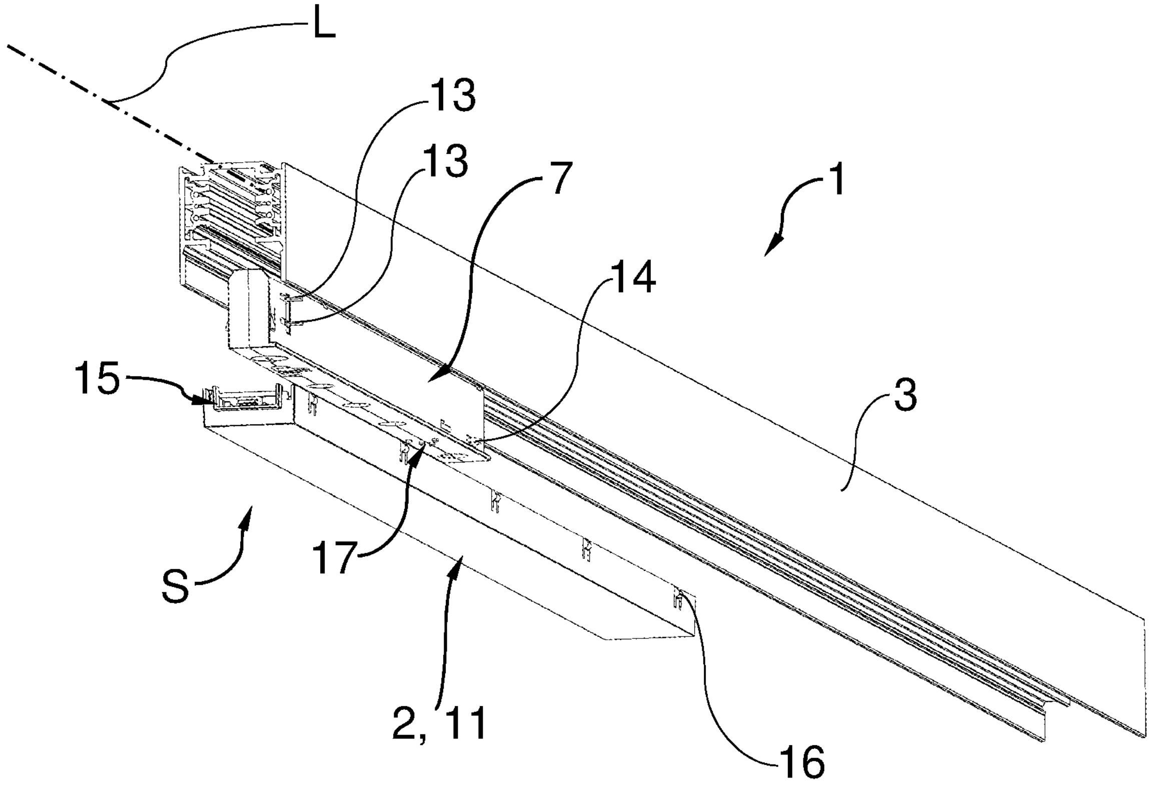
FIG. 2 shows a second perspective exploded view of the lighting arrangement of FIG. 1.
Figure 3:
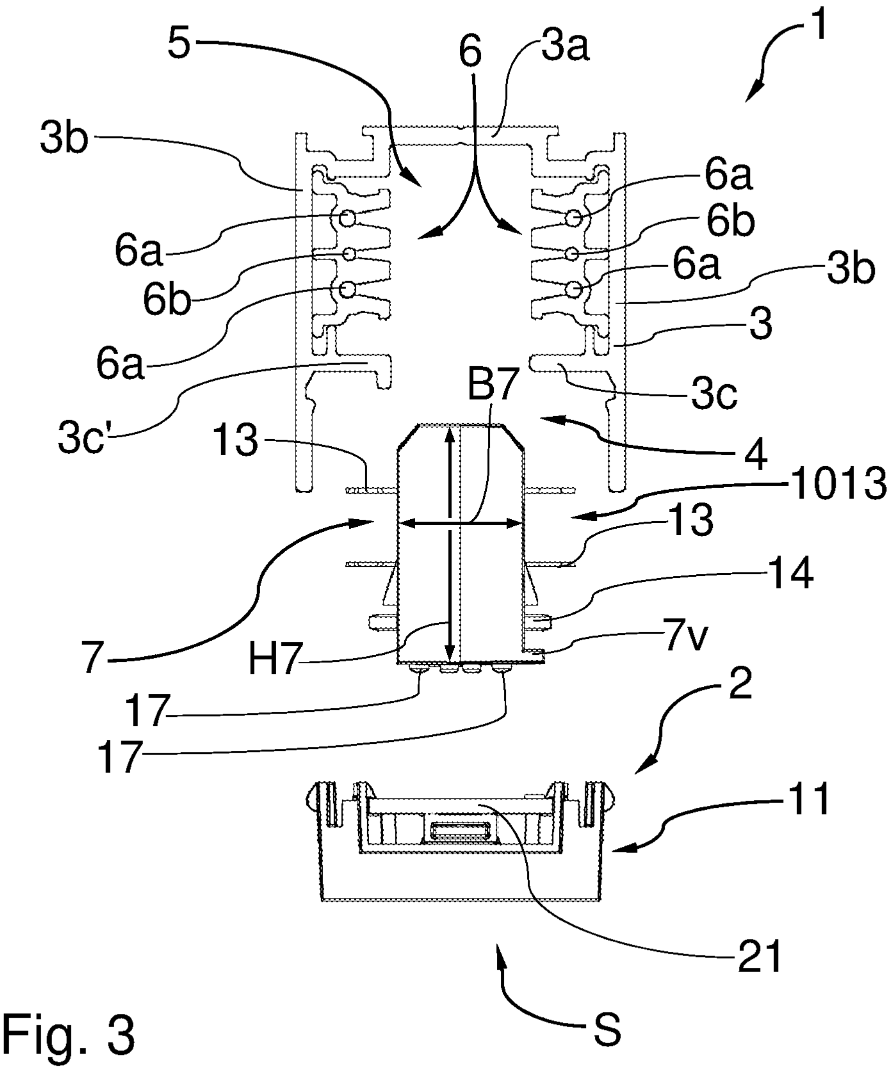
FIG. 3 shows an exploded view of the lighting arrangement of FIG. 1 from the end face thereof.

The attached drawings are intended to provide improved understanding of the embodiments of the invention. They illustrate embodiments and are used in conjunction with the description to explain principles and concepts of the invention. Other embodiments and many of said advantages will be apparent in view of the drawings. The elements in the drawings are not necessarily illustrated to scale with respect to each other.

In the figures, like and functionally identical elements, features and components and elements, features and components acting in an identical manner are provided with the same reference signs, unless indicated otherwise.

DESCRIPTION OF EXEMPLIFIED EMBODIMENTS

FIGS. 1-9 show a first exemplified embodiment of a lighting arrangement 1. In this case, the lighting arrangement 1 is formed having components which are part of a modular rail lighting system. The rail lighting system is designed in such a way that optionally linear lighting modules and/or low-voltage rails and/or spotlights can be accommodated in a rail profile and combined in many ways. The lighting modules can have e.g. reflectors or can have lenses and/or opal covers. Further lighting units can be coupled to the low-voltage rails, if present, which, like the linear lighting modules and spotlights, are preferably used for direct lighting. In addition, the rail lighting system includes the possibility of providing indirect lighting by means of one or more indirect lighting modules in some variants. Advantageously, not every single insertable illuminating component has to be equipped with a dedicated converter. The rail lighting system can be described in particular as a three-phase or five-phase system having low-voltage lighting components.

It should be mentioned that the rail profile can be designed for installation in a ceiling, mounting on a ceiling and/or suspension from the ceiling of a room or from another construction.

Firstly, the first exemplified embodiment will be described, in which direct lighting is made possible by means of a linear lighting module 11.

In the first exemplified embodiment, the lighting arrangement 1 has a rail profile 3 which is open towards the visible side S, and thus in a finished mounted position in particular on the lower side, and has a first inner region 4 as well as a second inner region 5 located in the rail profile 3 above the first region 4 and thus arranged further towards a rear side of the rail profile 3 facing away from the visible side S. On the rear side, and in the finished mounted position in particular in an upper region of the rail profile 3, the second region 5 is closed off by a web 3*a*, from the opposite ends of which flanges or side walls 3*b* of the profile 3 extend. Inner longitudinal ribs 3*c*, 3*c*' of the profile 3 delimit the regions 4 and 5 from one another, wherein an intermediate space between the longitudinal ribs 3*c*, 3*c*' provides access to the second region 5 from the first region 4. Except for end sections of the longitudinal ribs 3*c*, 3*c*', the rail profile 3 is symmetrical in cross-section in relation to a longitudinal centre plane of the profile 3.

In the second region 5, conductor rails each having three poles or conductors are arranged on both sides along the rail profile 3 and in parallel with the longitudinal direction L thereof. The conductor rails form a conductor device 6 with a total of six conductors 6*a*, 6*b*, wherein four conductors 6*a* thereof are designed to provide electrical energy and two conductors 6*b* arranged opposite one another are provided to provide control signals. Three of the conductors 6*a* are preferably each designed as phase conductors to provide three different electrical phases and a fourth one of the conductors 6*a* is designed as a neutral conductor.

Figure 16:
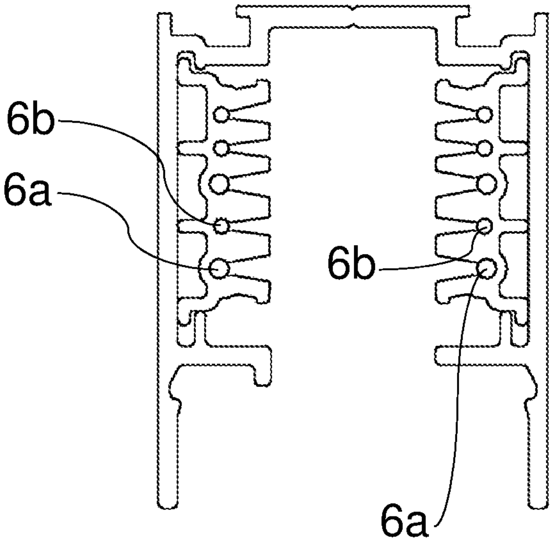
FIG. 16 show further variants of a rail profile, shown in each case with a conductor device, in a sectional view.

In one variant, see also FIG. 16, the conductor device 6 could alternatively provide in each case e.g. five poles or conductors 6*a*, 6*b* on both sides of the second region 5 and thus a total of ten conductors 6*a*, 6*b*, in order to be able to additionally switch emergency lights to a separate phase. Again, two conductor rails, and a total of at least two conductors 6*b* for providing control signals, are provided in the inner region 5.

For example, a DALI-signal for control purposes is provided by means of the conductors 6*b*. However, a control signal based on other control or dimming methods is likewise feasible.

In FIGS. 1-9, the conductors 6*a* are thus provided for supplying illuminating components with electrical energy and are supplied with electrical current, preferably alternating current at mains voltage, such as 220-240V, for instance 230V, and a mains frequency of e.g. 50 Hz, by a feed unit (a so-called "power feeder") which is not shown in greater detail. This will be referred to hereinafter by the term "high voltage".

In the rail lighting system described in the present case, and thus also in the lighting arrangement 1, illuminating components are provided which are operated with electrical energy at a substantially lower voltage, for instance at a direct voltage lower than 60V, e.g. 48V. This will be referred to hereinafter as "low voltage".

The second region 5 of the rail profile 3, which is formed as an upper interior space, is designed to accommodate an adapter unit 7, wherein the adapter unit 7 has a converter which converts the high voltage of the conductors 6*a* of the conductor device 6 into low voltage for supplying the illuminating components, in the first exemplified embodiment the lighting module 11, and in this case provides the type of current required by the illuminating components at the low voltage. The converter is arranged within the adapter unit 7. Preferably, the adapter unit 7 further comprises a device, not shown in greater detail in the figures, which renders it possible to select the electrical phase of the electrical phases provided by conductors 6*a* to be used and to couple the lighting unit 11 to the selected phase for the supply of power.

In the installed state, the adapter unit 7 is accommodated for the most part within the second region 5 and has substantially the basic shape of an elongate cuboid with bevelled longitudinal edges on the side thereof facing the web 3*a* in the installed state. In this case, the adapter unit 7 has a slender and space-saving design. For example, see FIG. 3, a height H7 of the adapter unit 7 can be approximately H7=28 mm and a width B7 of the adapter unit 7 can be approximately B7=14 mm. In particular, the ratio H7/B7 is thus approximately 2. A length of the adapter unit 7, see FIG. 1, can be approximately L7=300 mm. It is understood that in variants, deviations from these values for H7, B7 and/or L7 are possible, e.g. H7, B7 and/or L7 could each deviate by 2 mm upwards or downwards from said values.

Figure 11:
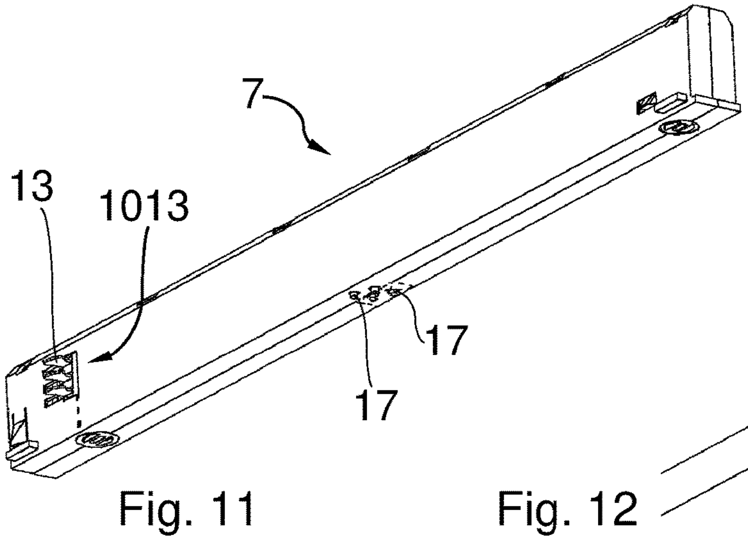
FIG. 11 shows an adapter unit of the lighting arrangement of FIG. 10 in an enlarged view.

In the region of longitudinal side surfaces of the adapter unit 7, said adapter unit has a contact device 1013 with contact elements 13 which can be extended or folded out of the outer surface of the adapter unit 7 in order to make electrically conductive contact with one of the conductors 6*a* in each case. Contact elements 13 can also be provided for picking up the control signal, e.g. as indicated for the variant of FIG. 11 as two middle contact elements 13 of a movable arrangement of six contact elements 13, of which three can each protrude from one of the two longitudinal sides of the adapter unit 7. In this way, the adapter unit 7 can be electrically coupled to the conductor device 6 in order to receive electrical energy as well as control signals from the conductor device 6. The contact elements 13 can be folded out or in by a mechanism which can be actuated by a fitter or operator. In particular, in the case of a ten-pole rail, such as in FIG. 16, the contact device 1013 is not necessarily provided with contact elements 13 for contacting each of the ten conductors 6*a*, 6*b*, but nevertheless can be provided with e.g. four or six contact elements 13.

It should be noted that the adapter unit 7 can be placed freely in the inner region 5 substantially at any point along the rail 3. In addition, the adapter unit 7 inserted into the region 5 can be displaced in the longitudinal direction L of the rail profile 3 when the contact elements 13 are folded in and thus do not contact the conductors 6*a*, 6*b*.

Furthermore, mechanical engagement elements 14 are provided in the region of the two longitudinal side surfaces of the adapter unit 7, which can also be extended or folded out from the outer surface in order to releasably mechanically secure the adapter unit 7 by engaging behind the inner longitudinal ribs 3*c* of the rail profile 3. In addition, further engagement elements can be provided e.g. in the form of latches or clips, which enable temporary, releasable fixing to facilitate mounting.

In FIGS. 1-6, the second region 5 is defined towards the first region 4 by the inner longitudinal ribs 3*c* of the rail profile 3. These ribs 3*c* form a type of two-part intermediate wall, in the centre region of which an intermediate space remains along the entire length of the rail profile 3 as a passage for introducing the adapter unit 7. In the first exemplified embodiment, the flanges or side walls 3*b* of the rail profile 3 extend downwards beyond the ribs 3*c*, whereby the first region 4 is formed.

The adapter unit 7 in FIGS. 1-6 has, on the side facing the visible side S in the installed state, in the figures on the underside, punctiform, pin-like or pin-head-like contact elements 17, some of which serve as "current collectors" for establishing the electrical supply to the lighting module 11, and one or more others of the contact elements 17 can serve to transmit signals for control purposes.

For the lighting arrangement 1 of FIGS. 1-6, an assembly 2 is illustrated as the illuminating component and is designed as the linear lighting module 11 for providing direct lighting. The lighting module 11 can have e.g. an opal cover and/or lenses on the visible side, wherein other configurations e.g. with a clear cover or without a cover, with or without lenses, are likewise conceivable.

The lighting module 11 also has a double-sided printed circuit board ("PCB") 21 on the upper side thereof in the installed state, on the main surface of which facing outwards on the lighting module 11 strip-like contact elements 18 are formed as tracks and serve to establish an electrical coupling to the adapter unit 7 via the contact elements 17 for the purpose of supplying energy and for control purposes. Arranged on the other, inwardly facing main surface of the printed circuit board 21 are light-generating devices which are designed as LEDs. Further electrical and/or electronic devices for operating the LEDs, as well as tracks for connecting the individual devices, can likewise be arranged on the printed circuit board 21.

When assembling the lighting arrangement 1, the adapter unit 7 is initially introduced from below into the second region 5, is electrically coupled to the conductor device 6 by means of the contact elements 13 e.g. with rotation of an actuating element, and e.g. is additionally secured mechanically by means of the elements 14.

FIGS. 3-6 show that the adapter unit 7 has a protrusion 7*v* on a longitudinal edge adjoining the underside of the adapter unit 7 facing the region 4 in the inserted state, which protrusion abuts the longitudinal rib 3*c* when the adapter unit 7 is in the correctly inserted state. The other longitudinal rib 3*c*', unlike the longitudinal rib 3*c* which is flat on a side facing the region 4, has an additional end section protruding towards the region 4. This end section causes the adapter unit 7 to be able to be introduced to a lesser extent into the region 5 in the inverted orientation, i.e. with the protrusion 7*v* abutting against the longitudinal rib 3*c*', than in the correct position of FIGS. 3-6. Therefore, electrical coupling to the conductor device 6 can be avoided in an incorrect insertion position of the adapter unit 7. For the operator, insertion of the adapter unit 7 in an incorrect position can also be recognised in this manner.

Then, the lighting module 11 is inserted from below into the first region 4 below the adapter unit 7 and latched or clipped in behind further longitudinal ribs of the rail profile 3 with the aid of latch or clip devices 16. Above the longitudinal ribs, longitudinal grooves or recesses 4*a* are formed in the region 4 on both sides in the side walls 3*b*, into which the latching devices 16 can engage.

The latching devices 16 together with corresponding longitudinal ribs and longitudinal grooves 4*a* of the profile 3 are designed in such a way that the assembly 2 can be clipped/latched into the region 4 with only relatively little force or pressure from below, i.e. from the visible side S, and can then also be pulled out of the rail profile 3 from below with comparatively little force, e.g. by tightening at one of the end-face ends of the module 11. In particular, fixing of the assembly 2, in this example of the lighting module 11, in the longitudinal direction L is not provided in the exemplified embodiment. This and the suitable force effect of the latching/clipping devices 16 allow the lighting module 11 to be displaced longitudinally in the longitudinal direction L, even after it has been clipped into the rail profile 3, thus making position adjustments possible.

The reception of current by the lighting module 11 is made possible by means of a number of the tracks 18 which are attached to the printed circuit board 21 and which come into electrically conductive contact with in each case an allocated one of the punctiform contact elements 17 of the adapter unit 7. In this case, the strip-like contact elements 18 are provided on a side of the assembly 2 facing the adapter unit 7, and extend in the longitudinal direction L of the rail profile 3 when the assembly 2 is inserted into the first, lower region 4. This ensures that the lighting module 11 can still be displaced within the rail profile 3 in the longitudinal direction L even after the electrical coupling and at the same time a power supply is ensured as long as the printed circuit board 21 is located at any position under the collectors 17 of the adapter unit 7.

The double-sided board 21 attached to the top side of the lighting module 11 thus also separates the two rail interior spaces 4 and 5 and is configured to receive power from the adapter 7 attached above it.

The control signal, e.g. a DALI signal or a control signal based on another protocol, is taken from the conductor device 6 by the adapter unit 7, and the lighting module 11 is operated on the basis of this control signal. In the first exemplified embodiment with the linear lighting module 11, the control signal can be interpreted by devices in the adapter unit 7, an output signal can be generated to activate the lighting module 11 and the output signal can be transmitted to the lighting module 11 via one or more of the contact elements 17. Alternatively, provision can be made that the control signal received from the conductor device 6 is relayed by the adapter unit 7 via one or more of the contact elements 17 to the lighting module 11 and is interpreted by devices in the lighting module 11.

Figure 7:
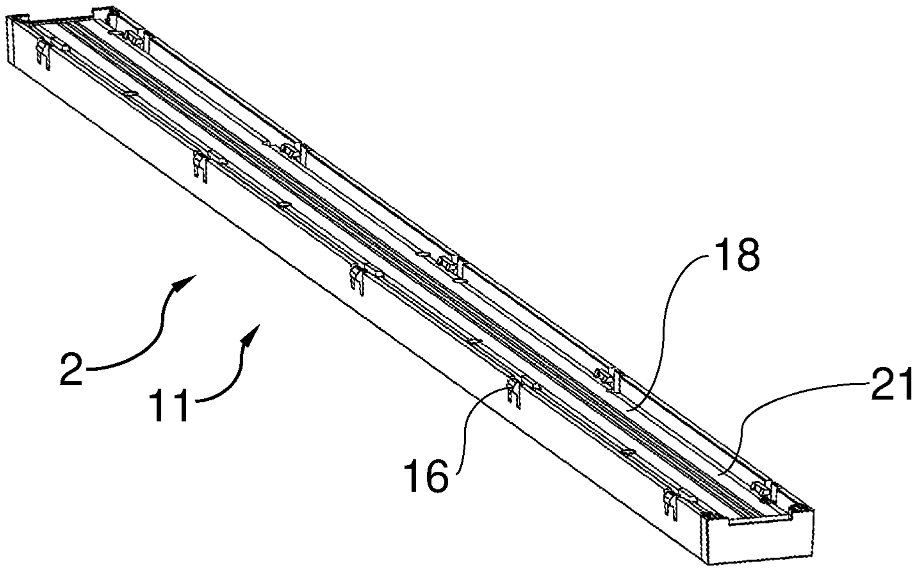
FIG. 7 shows a perspective view of a lighting module, designed for direct lighting, for the lighting arrangement according to the first exemplified embodiment, from the rear side thereof facing away from the visible side in the mounted state.
Figure 8:
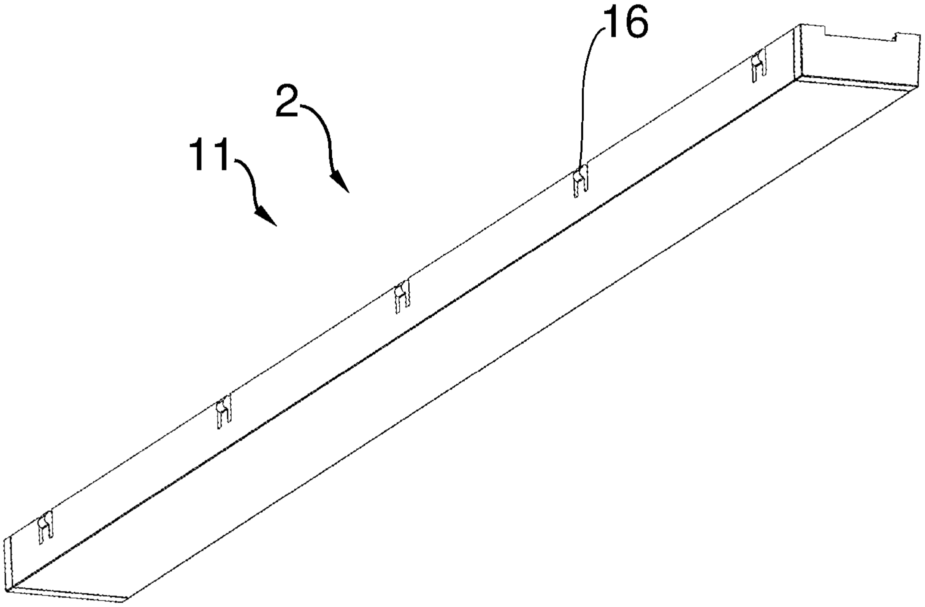
FIG. 8 shows the lighting module of FIG. 7 as seen in perspective from the visible side.
Figure 9:
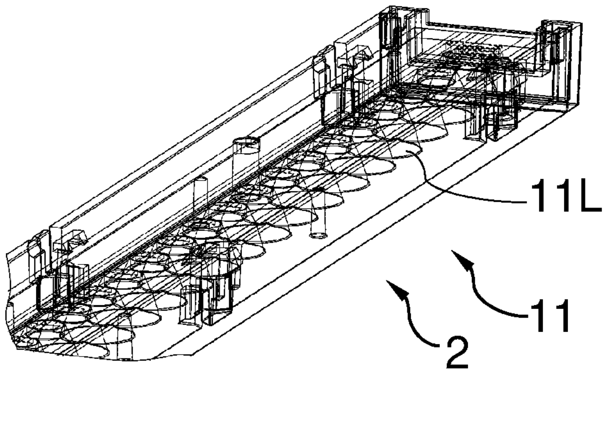
FIG. 9 shows a transparent view of a section of the lighting module of FIG. 7 to illustrate lenses provided therein.

An example of the lighting module 11 with an opal cover extending over the entire length of the lighting module 11 is illustrated in FIGS. 7 and 8. Alternatively, or in addition to the opal cover, the lighting module 11 can be equipped in variants with lenses 11L. This is schematically illustrated in FIG. 9.

The rail profile 3 can be formed with a plurality of rail profile sections which are connected to one another to form a longer linear or also angled system of selectable length which can accommodate a multiplicity of illuminating components of the same or different type. If the rail profile 3 is constructed having a plurality of sections joined together, each with conductor rail sections arranged therein to form the conductor device 6, the conductor rail sections forming the conductor device 6 can be electrically connected in the second region 5, i.e. in the upper high-voltage region of the rail profile 3, to intermediate or connecting pieces (not illustrated in more detail in the figures) for electrically coupling the corresponding conductors 6*a*, 6*b*.

Figure 10:
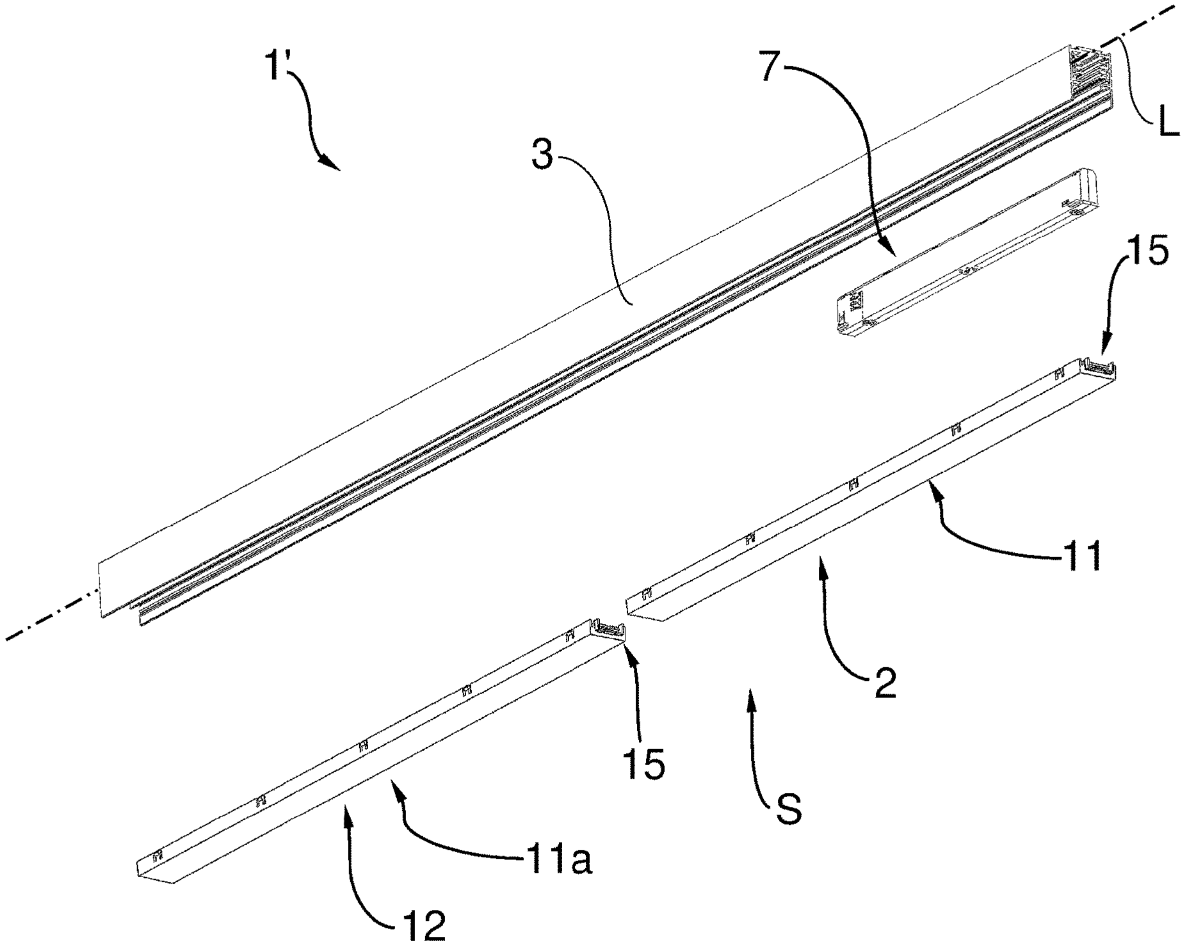
FIG. 10 shows a variant of the lighting arrangement according to the first exemplified embodiment, in a perspective exploded view from the visible side.

For example, see FIG. 10, in the case of a lighting arrangement 1', which is a variant of the arrangement 1, a first assembly 2 designed as a linear lighting module 11 and one or more further assembly(ies) 12, each likewise designed as a linear lighting module 11*a*, of which only one is illustrated in FIG. 10, can be provided.

The end faces of the assemblies 2, 12 are each equipped with connecting devices 15 provided for this purpose, e.g. plug connectors, in such a way that the assembly 2 can be electrically coupled in each case to one of the further assemblies 12 at both end-face ends thereof. In this manner, the assembly 2 and, thereby, the assembly(ies) 12 are supplied with electrical energy provided by the adapter unit 7, in particular with direct current at low voltage as explained in more detail above. The devices 15 or "board connectors" 15 for coupling adjacent lighting modules are not illustrated in detail, for instance, in FIGS. 7-9 but are illustrated e.g. in FIGS. 1, 2, 10 and 12 and connect e.g. the boards of the adjacent lighting modules 11, 11*a*.

Therefore, in the case of a longer lighting arrangement 1', not each section of the rail profile 3 and not each lighting module 11, 11*a* requires a separate adapter unit in the upper (high voltage) rail profile inner region 5. A plurality of assemblies 2, 12, in FIG. 10 designed as linear lighting modules 11, 11*a*, can be supplied with power from a common adapter unit 7. For example, a total of three modules 11, 11*a* can be supplied by means of a common adapter unit 17, wherein a further module 11*a* can be provided in particular at each end of the module 11, but a longer row with further modules 11*a* is likewise feasible.

In addition, the assemblies 2, 12 are controlled and operated according to a master-slave principle. In this case, the assembly 2 directly coupled to the adapter component 7 is considered to be the "master", to which the further assembly(ies) 12 indirectly coupled to the adapter unit 7 via the assembly 2 and the devices 15 are subordinated as "slave". The interpretation of the control signal applied to the conductors 6*b*, for instance as a DALI signal, can be carried out by the adapter unit 7 or the first assembly 2 ("master"), wherein an output signal generated on the basis of the control signal from the adapter unit 7 or the assembly 2 is passed to the "slave" assembly(ies) 12 via the device 15. In both cases, the assemblies 2 and 12, i.e. the lighting modules 11 and 11*a*, are activated via a common address, e.g. a common DALI address, this address is thus allocated to the adapter 7 or the module 11 and indirectly to the coupled modules 11*a*. The extension lighting module 11*a* not only receives power, but also control signals corresponding to the first lighting module 11.

At the same time, the assemblies 2, 12 can be displaced together along the rail 3, e.g. to make even smaller positional adjustments after insertion into the rail profile 3. In an advantageous manner, the adapter component 7 does not have to be released and repositioned in the high-voltage region 5 for this purpose.

Figure 12:
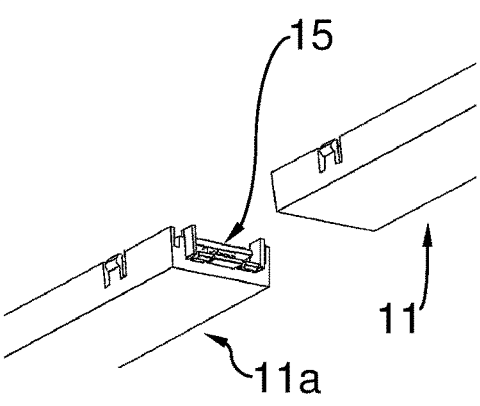
FIG. 12 shows end sections of lighting modules of the lighting arrangement of FIG. 10 in an enlarged view.

The same applies to the lighting module 11 of FIGS. 10, 12 as described above for FIGS. 1-9. The lighting module 11*a* of FIGS. 10, 12 is likewise designed in a similar manner to the lighting module 11, wherein the printed circuit boards ("PCBs") of the further assembly(ies) 12, i.e. of the second and further lighting modules 11*a* indirectly coupled to the adapter component 7, are not necessarily double-sided. Rather, it may be sufficient if the printed circuit board in the lighting module(s) 11*a* allows the supply of power and operation of the LEDs, which, as in the lighting module 11, are arranged on the inwardly directed main surface of the printed circuit board, and the supply of power and signals via the device(s) 15. In the case of the lighting module 11*a*, corresponding tracks and devices can be arranged by way of example, like the LEDs, on the inwardly directed main surface of the printed circuit board, especially since a direct conductive connection to contact elements of an adapter unit 7 is not necessary in the case of the lighting module 11*a* and the contact elements 18 are therefore not required in the case of the lighting module 11*a*. The printed circuit boards of the lighting module(s) 11*a* can thus be manufactured more cost-effectively than those of the lighting module 11.

In particular, the modules 11, 11*a*, which are supplied together—directly ("master") or indirectly ("slave")—by an adapter 7, are switched in the same electrical phase selected by means of the adapter unit 7 and are supplied thereby.

The rail lighting system, based on which the arrangements 1, 1' are constructed as described above, can comprise alternatively usable rail profiles which can be used in place of the rail profile 3 and are shown by way of example in FIGS. 13-16. The profiles of FIGS. 13-15 differ from the profile 3 of FIGS. 1-6 and 10 in that the flanges or side walls 3*b* are shortened in cross-section towards the visible side, as in FIGS. 13-14, or are extended in cross-section to accommodate deeper assemblies, as in FIG. 15. FIG. 16 shows a variant, in which the upper region 5 is designed to accommodate a conductor device 6 with a total of ten conductors, only some of which are designated by reference signs in FIG. 16.

Further variants of the lighting arrangement 1, in which the assembly 2 and the further assembly 12 are each designed as a lighting module 11', 11*a*', are shown in FIGS. 17-22. The lighting arrangement 1" of FIGS. 17-22 has a rail profile 3', wherein this is designed as mentioned in accordance with FIG. 15 and differs from the rail profile 3 of FIGS. 1-6, 10 with regard to the side walls or flanges 3*b* extended towards the visible side S, and so a deeper first region 4 is achieved.

Figure 17:
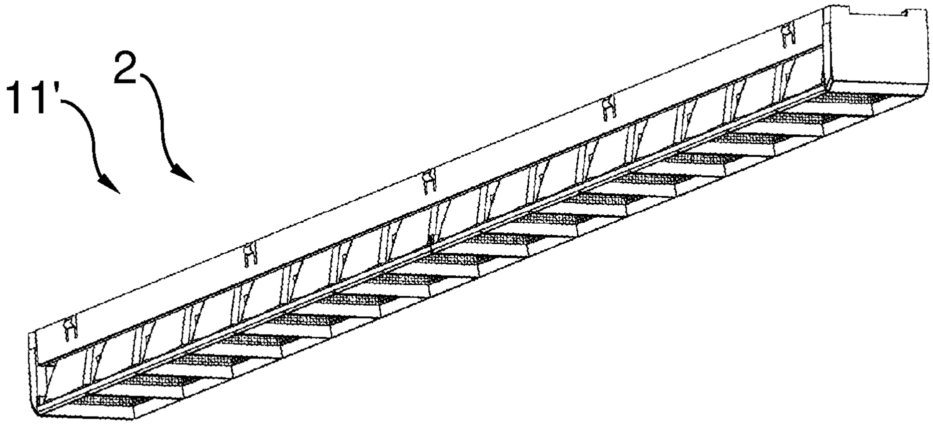
FIG. 17 shows a lighting module having reflectors, designed for direct lighting, for a lighting arrangement according to a further variant of the first exemplified embodiment, as seen in perspective from the visible side.
Figure 18:
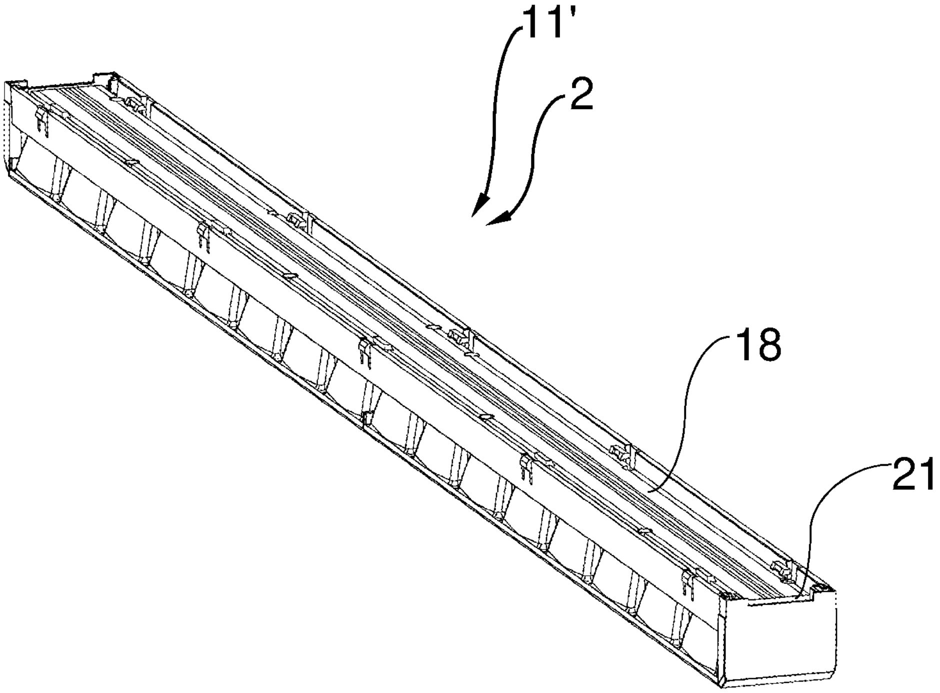
FIG. 18 shows the lighting module of FIG. 17, as seen in perspective from the rear side thereof facing away from the visible side.

The lighting module 11' in FIGS. 17, 18 has a row of reflectors which are open towards the visible side S and reflect in a desired manner light emitted by the light-generating devices in the form of LEDs on the board 21. With the exception that—instead of lenses and/or an opal or clear cover—the reflectors are provided, and that the arrangement of the LEDs on the board 21 may be suitably adapted to the arrangement of the reflectors, the lighting module 11' is similar to the lighting module 11, as described above.

Figure 21:
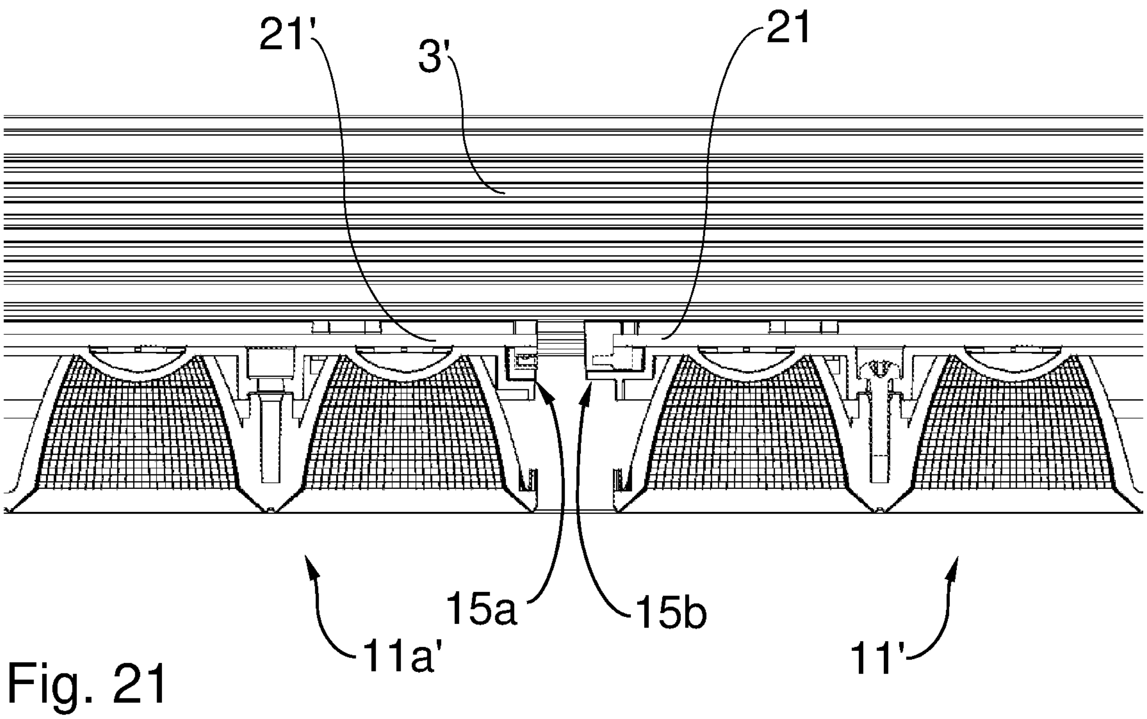
FIG. 21 shows a further section of the arrangement of FIG. 19, prior to coupling of two adjacent lighting modules with reflectors for direct lighting, in a longitudinal section.
Figure 22:
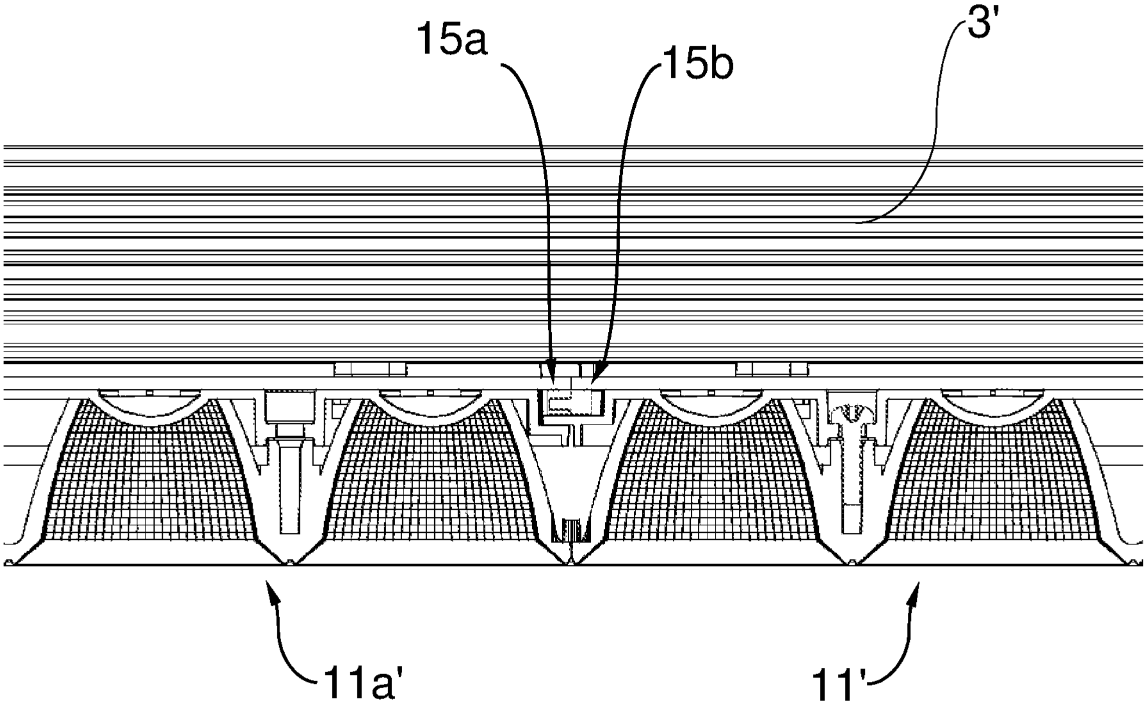
FIG. 22 shows the situation of FIG. 21, after coupling of the two lighting modules, in a longitudinal section.

In FIGS. 17, 18, devices for electrical coupling on the end face-side are not shown. However, in FIGS. 19-22, similar to the exemplified embodiment of FIGS. 10, 12, devices 15*a*, 15*b* are provided at facing end-face ends of the lighting modules 11', 11*a*' in order to electrically couple adjacent assemblies 2, 12 to one another, similar to that described above with respect to FIGS. 10-12. FIG. 21 shows adjacent lighting modules 11', 11*a*' in a mounting step before the electrical coupling of both at the mutually facing end faces thereof, FIG. 22 in the coupled state. The devices 15*a*, 15*b* are designed to correspond to each other, e.g. as plug connections. In particular, at least one further module 11*a*' can be provided at each of the two ends of the module 11'.

The displaceability of the lighting modules 11', 11*a*' in relation to the adapter unit 7 in the inserted state is given in the same way as in the exemplified embodiments of FIGS. 1-10. By enabling a longitudinal displacement along the rail profile 3' after latching-in or clipping-in as well as in the state of electrical coupling of the adapter unit 7 and first lighting module 11', the work steps of FIGS. 21-22 can be carried out in a simplified manner.

Operation, supply and control of the lighting modules 11', 11*a*' are effected as described with respect to FIGS. 1-12. In particular, in FIGS. 13-22, the conductor device 6 in the second region 5 is designed in each case to provide an electrical alternating voltage, e.g. mains voltage, for the electrical supply, e.g. in the range of approximately 220V to 240V, in particular 230V at 50 Hz. By means of a converter in the adapter unit 7, the high voltage is converted into an electrical direct voltage lower than 60V, e.g. 48V, for operating the illuminating components.

Figure 44:
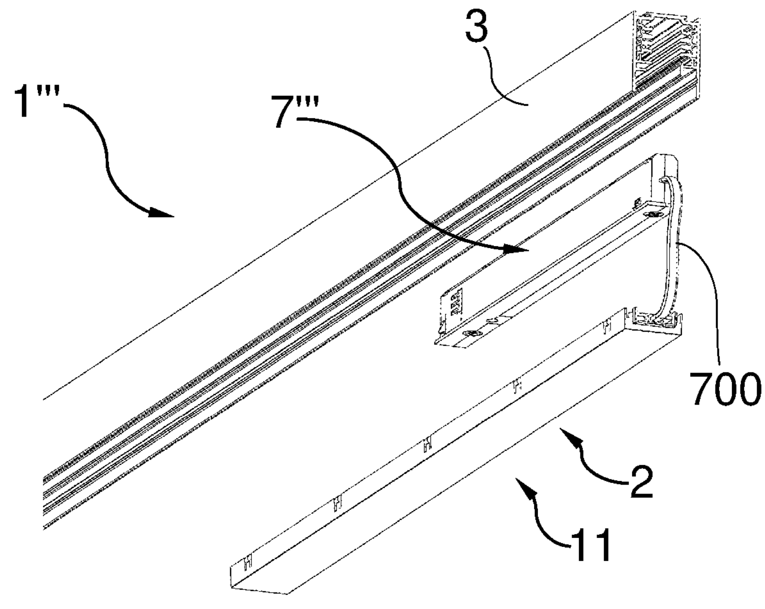
FIG. 44 shows a perspective view of some parts of a lighting arrangement according to a further modification of the first exemplified embodiment.
Figure 4:
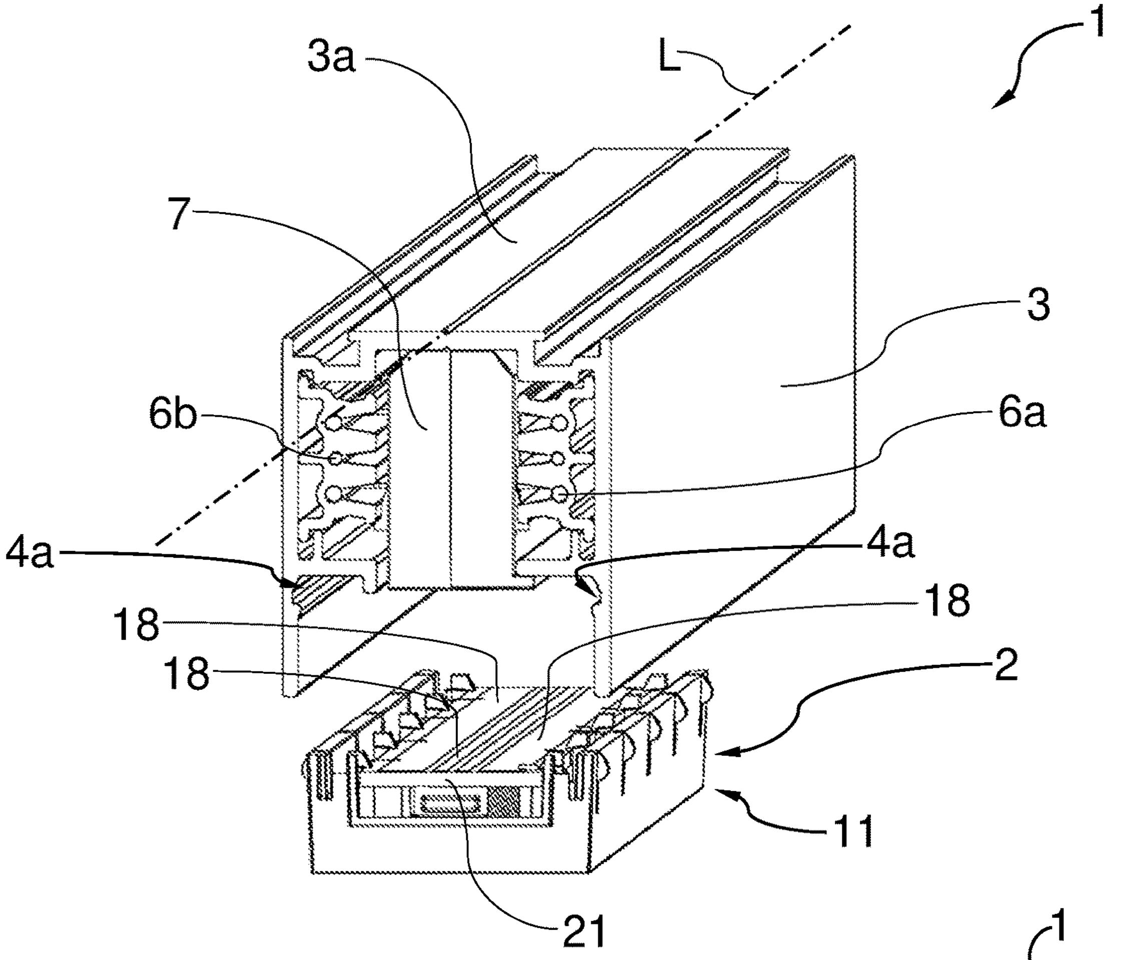
FIG. 4 shows a partially assembled perspective view of the lighting arrangement of FIG. 1 from the rear side thereof opposite a visible side.
Figure 6:
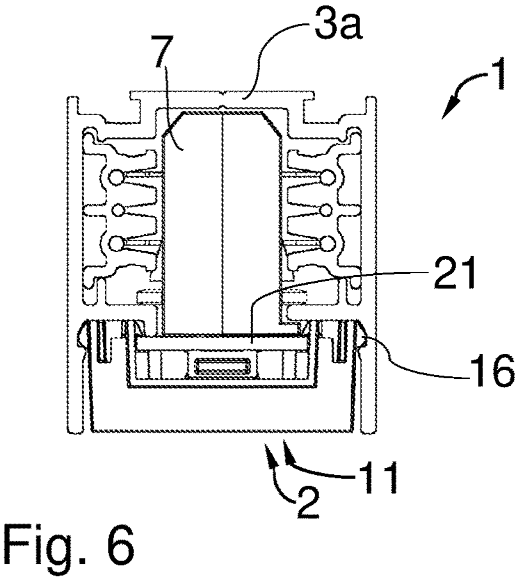
FIG. 6 shows an end-face view of the lighting arrangement of FIG. 1 in the assembled state.
Figure 5:
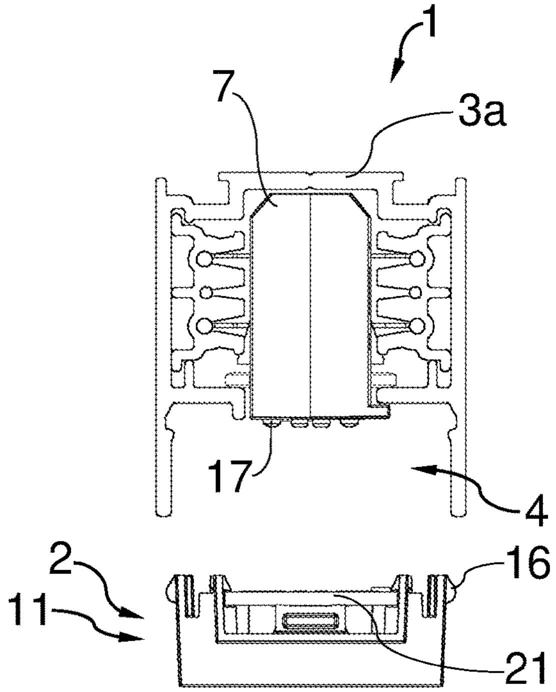
FIG. 5 shows the situation of FIG. 4 in an end-face view.

A lighting arrangement 1''' according to a further modification of the first exemplified embodiment is shown in FIG. 44. In this case, the assembly 2 which again is designed as a lighting module 11 is electrically coupled to an adapter unit 7''' by means of a flexible cable 700. The assembly 2 which is cabled in this manner to the adapter unit 7''' is displaceable relative to the inserted adapter unit 7''' along the longitudinal direction L of the rail profile 3 even after insertion of the assembly 2 into the region 4. The length of the cable 700 and/or the positioning thereof can be selected or varied differently, e.g. depending on the desired possible displacement, e.g. in order to allow better access to a phase selection push-button switch on the underside of the adapter unit 7''' in the cabled state. In addition to the foregoing, the lighting module 11 and the adapter unit 7''' correspond to the lighting module 11 and the adapter unit 7 described above.

FIGS. 23-32 show a lighting arrangement 1*a*, 1*a*' according to a second exemplified embodiment and variants thereof.

Figure 23:
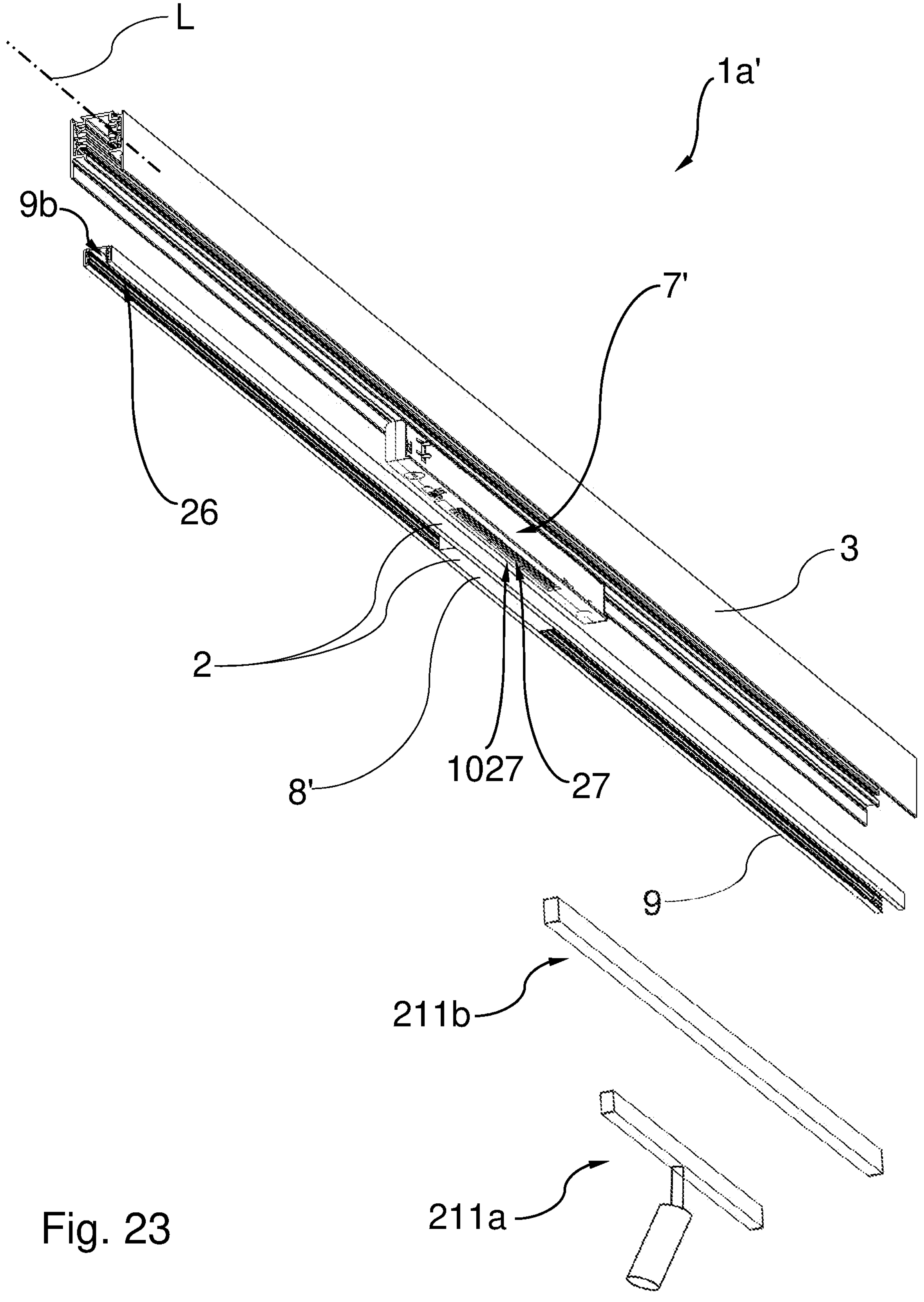
FIG. 23 shows a lighting arrangement according to a second exemplified embodiment, as seen in a perspective first exploded view from a visible side.

The lighting arrangement 1*a*' of FIG. 23 has a rail profile 3 which corresponds to that described with respect to the first exemplified embodiment.

In the second exemplified embodiment, a second, smaller rail profile 9 is accommodated in the first region 4 of the rail profile 3. The second, smaller rail 9 is supplied with low voltage from an adapter unit 7' located thereabove in the installed and operating state. The rail 9 is designed to accommodate and/or couple, at least partially, to lighting units 211*a*, 211*b*—illustrated only schematically in the figures. Furthermore, the rail 9 enables the supply of power to the lighting units 211*a*, 211*b*, moreover the rail 9 can provide control signals for the lighting units 211*a*, 211*b* coupled to or accommodated by the rail 9, wherein the lighting units 211*a*, 211*b* are equipped e.g. with suitable devices for electrical coupling and e.g. furthermore for mechanical coupling to the rail 9. The lighting units 211*a*, 211*b* coupled to the rail 9 are preferably displaceably coupled to the rail 9 and are provided in particular for direct lighting.

Furthermore, the lighting arrangement 1*a*' has a connecting unit 8' which enables electrical coupling of the rail 9 and the adapter unit 7'. An assembly 2 which can be accommodated in the first region 4 of the rail profile 3 is formed in this case with the rail 9 and the connecting unit 8'. In this case, provision is preferably made that the assembly 2, in particular the rail 9, can be latched to the rail profile 3 for mechanical fastening or can be clipped into the rail profile 3, for which purpose suitably designed means not illustrated in greater detail in the figures can be provided. The mechanical fastening of the assembly 2 formed with the rail 9 and the connecting unit 8' is configured similarly to the latching or clipping-in of the assembly 2 of the first exemplified embodiment such that a displacement of the rail 9 and the connecting unit 8' in the longitudinal direction L of the rail profile 3 is possible even after the latching or clipping-in. Also in the second exemplified embodiment, the latching of the assembly 2 with the rail profile 3, and the release from this latching, requires relatively little force, whereby the latching and release can be performed easily and quickly by an operator or fitter.

The adapter unit 7' is constructed in the same way as the adapter unit 7 with regard to its basic shape and dimensions, mechanical fixing in the outer rail profile 3 and electrical coupling to the conductor device 6, and so reference is made to the above explanations in this respect. A converter is arranged in the interior of the adapter unit 7'.

In contrast to the adapter unit 7, the lower side of the adapter unit 7', which in the mounted state faces the visible side S, is not equipped with punctiform current collectors for supplying lighting modules. Instead, the adapter unit 7' of FIGS. 23-32 has a contact device 1027 with a plurality of strip-like contact elements 27 on the underside of the adapter unit 7', i.e. the side facing the rail 9 when the adapter unit 7' and the assembly 2 comprising the rail 9 and the connecting unit 8' are inserted into the rail profile 3. The contact elements 27 can each be brought into electrically conductive contact with an allocated contact element 28 of the assembly 2 when the assembly 2 is inserted into the rail profile 3 below the adapter unit 7'. When the adapter component 7' is inserted into the second region 5 of the rail profile 3, the strip-like contact elements 27 extend with the longitudinal direction thereof in parallel with the longitudinal direction L of the rail profile 3.

The first low-voltage rail module, which can be inserted under the adapter unit 7' into the illustrated section of the rail profile 3 and forms the assembly 2, has a passage-opening 10' on an upper side of the rail 9 in the mounted state, wherein the passage-opening 10' is inserted into a web 9*a* of the rail 9. After inserting the adapter unit 7' and the assembly 2 into the rail profile 3, the web 9*a* faces the adapter unit 7'.

In the case of the second exemplified embodiment, the plurality of contact elements 28 of the assembly 2 are arranged on a protrusion-like contacting section 8*a*' of the connecting unit 8'. In this case, the contact elements 28 are designed as punctiform, pin-like or pin-head-like contact elements 28 on the top side of the contacting section 8*a*'.

By introducing the contacting section 8*a*' into the passage-opening 10', the punctiform contacts 28 of the connecting unit 8' can each be brought into electrical connection to one of the tracks 27 of the adapter 7' mounted thereabove, in order to electrically couple the assembly 2 to the adapter unit 7'.

Figure 27:
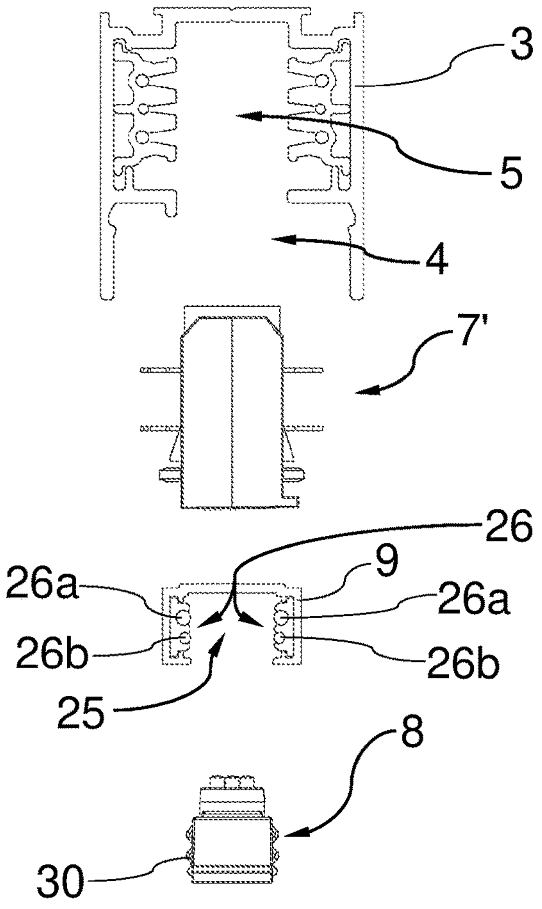
FIG. 27 show some steps when assembling a lighting arrangement according to FIG. 25 in an end-face view.
Figure 28:
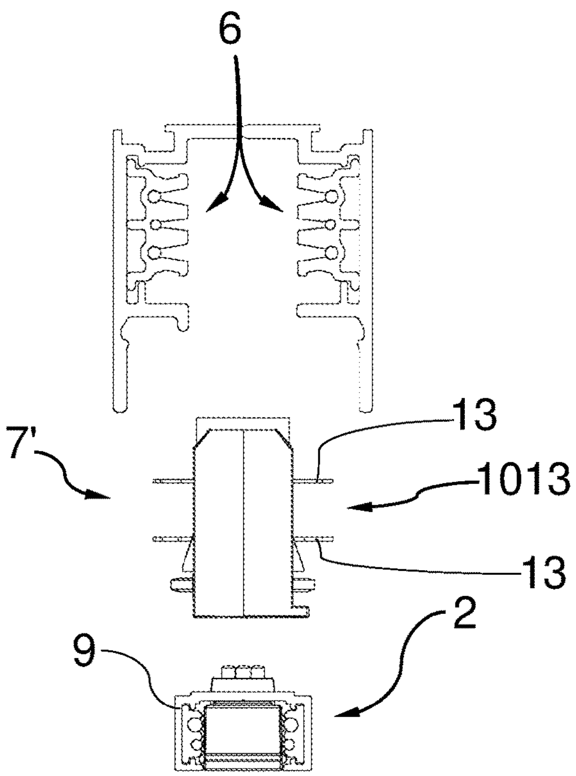
FIG. 28 show some steps when assembling a lighting arrangement according to FIG. 25 in an end-face view.
Figure 30:
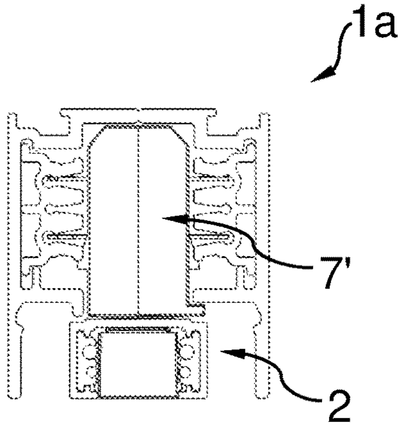
FIG. 30 show some steps when assembling a lighting arrangement according to FIG. 25 in an end-face view.
Figure 29:
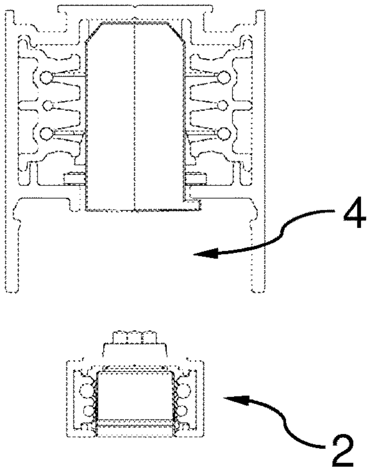
FIG. 29 show some steps when assembling a lighting arrangement according to FIG. 25 in an end-face view.

The connector 8' serves as a coupling unit and, as a further consequence, ensures the supply to the assembly 2 designed as a low-voltage rail module. In this case, in the case of the second exemplified embodiment, the rail 9 of the assembly 2 is equipped with a conductor device 26 comprising low-voltage conductors 26*a* and control signal conductors 26*b* along the longitudinal direction of the rail 9. A cross-section of the rail 9 is shown in FIG. 27 and is also provided in this form and configuration in the variant of FIGS. 23-24.

The low-voltage rail modules 2 are thus equipped to accommodate and supply power to the lighting units 211*a*, 211*b* to be operated at low voltage, as well as to supply control signals to the lighting units 211*a*, 211*b* on the rail 9.

In particular, provision is made that the conductors 26*a* of the conductor device 26 in the inner region of the rail 9 are supplied with electrical energy at low voltage, e.g. a direct voltage of 48V, and with one or more control signals, e.g. a DALI signal, via the adapter unit 7' and the connecting unit 8'.

The provision of the electric current at low voltage by means of the adapter unit 7', starting from the provision of mains voltage via the conductor device 6, is effected by means of a converter of the adapter unit 7', as described above with respect to the first exemplified embodiment. The low voltage for the supply of energy to the lighting units 211*a*, 211*b* is then relayed to the connecting unit 8' via e.g. two of the contact elements 27, 28 in each case. It is also possible to select an electrical phase with the aid of the adapter unit 7', as in the case of the first exemplified embodiment.

Control signals, for instance a DALI signal, provided at the conductors 6*b* of the conductor device 6 are relayed in the case of the second exemplified embodiment in unchanged form to the connecting unit 8' via one or more further corresponding ones of the contact elements 27, 28.

For example, on both sides of the inner region 9*b* of the rail 9, one conductor 26*a* per side can be provided for the supply of power and another conductor 26*a* can be provided for the control. The lighting units 211*a*, 211*b* which can be used there can be addressed in particular separately with control signals, for instance via dedicated, separate DALI addresses.

The connecting unit 8' is configured to receive the electrical energy and control signals from the adapter unit 7', and to feed the electrical energy received via contact elements 27, 28 into the conductors 26*a* of the conductor device 26 of the rail 9, as well as the control signals relayed by the adapter unit 7' via the further contact elements 27, 28 into the conductors 26*b*. Furthermore, the connecting unit 8' can be mechanically latched to the rail 9 of the assembly 2.

A variant of the lighting arrangement according to the second exemplified embodiment is shown in FIGS. 25-32. Except for the differences described hereinafter, the above explanations with respect to FIGS. 23, 24 also apply to the lighting arrangement 1*a* of FIGS. 25-32.

Again, the lighting arrangement 1*a* of FIGS. 25-31 has a rail profile 3, an adapter unit 7', and an assembly 2. With regard in particular to the configuration of the rail profile 3 as well as the adapter unit 7' and the functions thereof, reference is made to the above statements.

In the case of the variant of FIGS. 25-32, the assembly 2 again comprises a rail 9 with a conductor device 26 arranged in the inner region 25 thereof, which is divided into two and arranged on both sides of the inner region 25, see FIG. 27, and a connecting unit 8—shown enlarged in FIG. 31.

Figure 31:
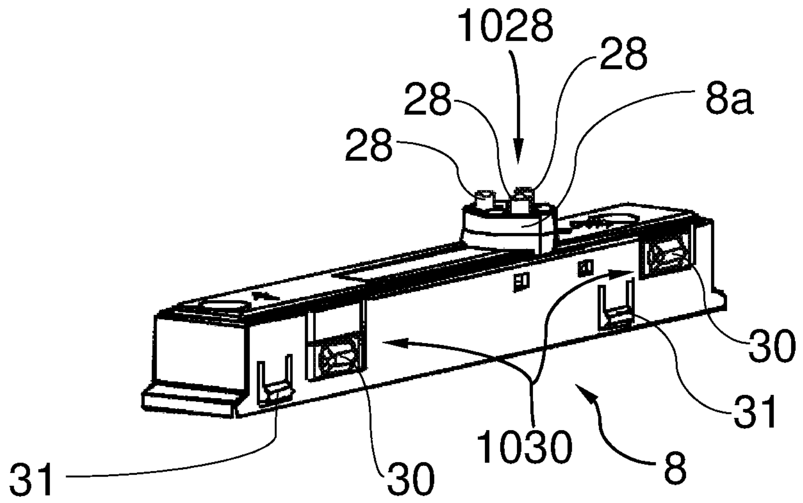
FIG. 31 shows a connecting unit for use in the variant of FIGS. 25-30.

The connecting unit 8 of FIGS. 25-32 is of elongated box-like outer shape and is designed to be arranged substantially entirely in the inner region 25 of the rail 9, such that the conductors 26*a* of the conductor device 26 are located laterally of the connecting unit 8, see FIGS. 27-30. A first contact device 1030 comprising contact elements 30, see FIG. 31, is configured to make electrically conductive contact with the conductors 26*a*, 26*b* of the conductor device 26 extending along the rail 9 when the connecting unit 8 is inserted into the inner region 25. Elastically resilient latching elements 31 serve to preferably releasably clip the connecting unit 8 into the rail 9 for mechanical coupling of the components 8 and 9.

Also in FIGS. 25-32, the connection unit 8 has the function of a coupling unit which enables the electrical coupling of the rail 9 to the adapter unit 7' for transmitting power and control signals. The connecting unit 8 has a contacting section 8*a* which is introduced into a passage-opening 10 in the web 3*a* of the rail 3 when the coupling unit 8 is inserted into the rail 9. A second contact device 1028 is provided on the contacting section 8*a* with—in FIG. 31 by way of example three—punctiform, pin-like or pin-head-like contact elements 28. The contact elements 28 are each designed and arranged to make electrically conductive contact with a corresponding one of the strip-like or web-shaped contact elements 27 of the adapter unit 7'.

Figure 24:
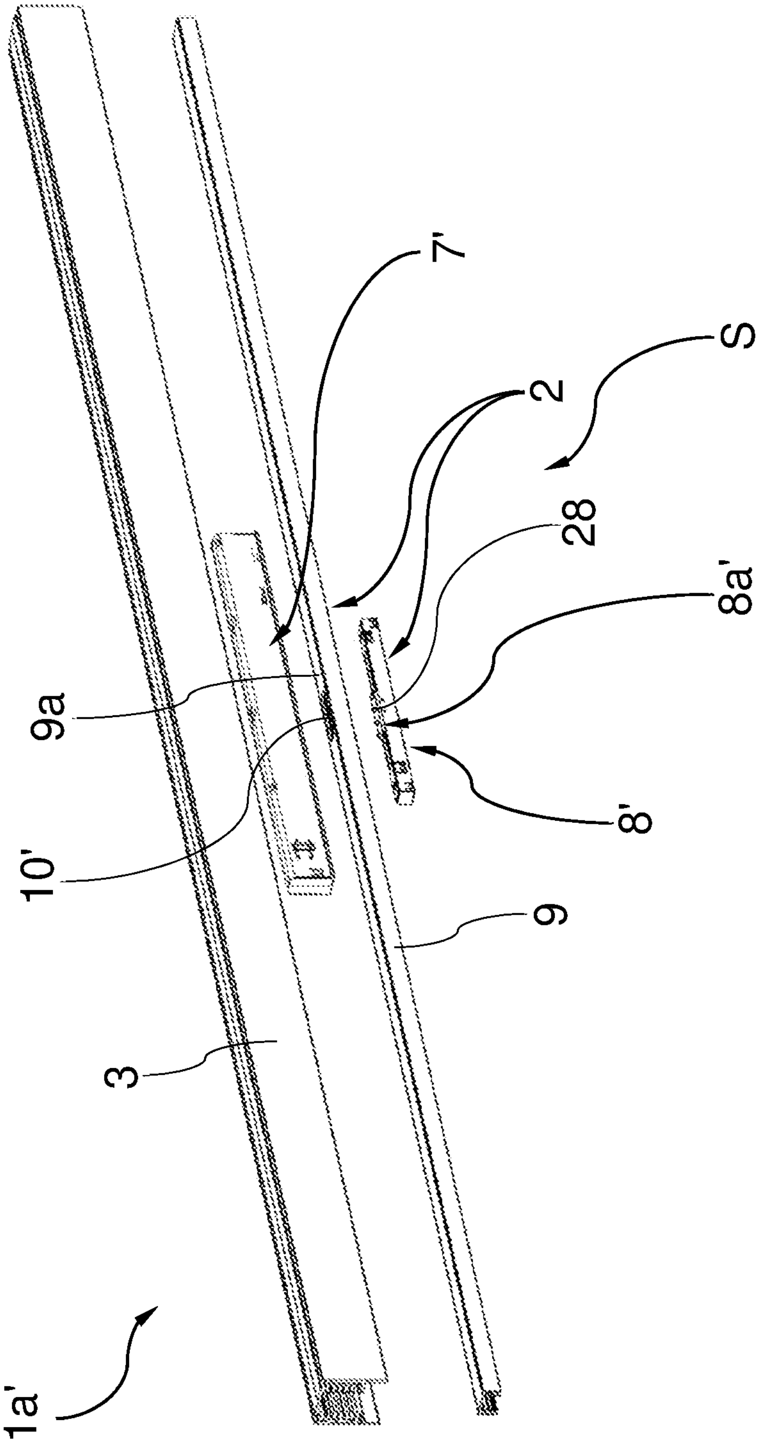
FIG. 24 shows the lighting arrangement according to FIG. 23 in a perspective, second exploded view.
Figure 25:
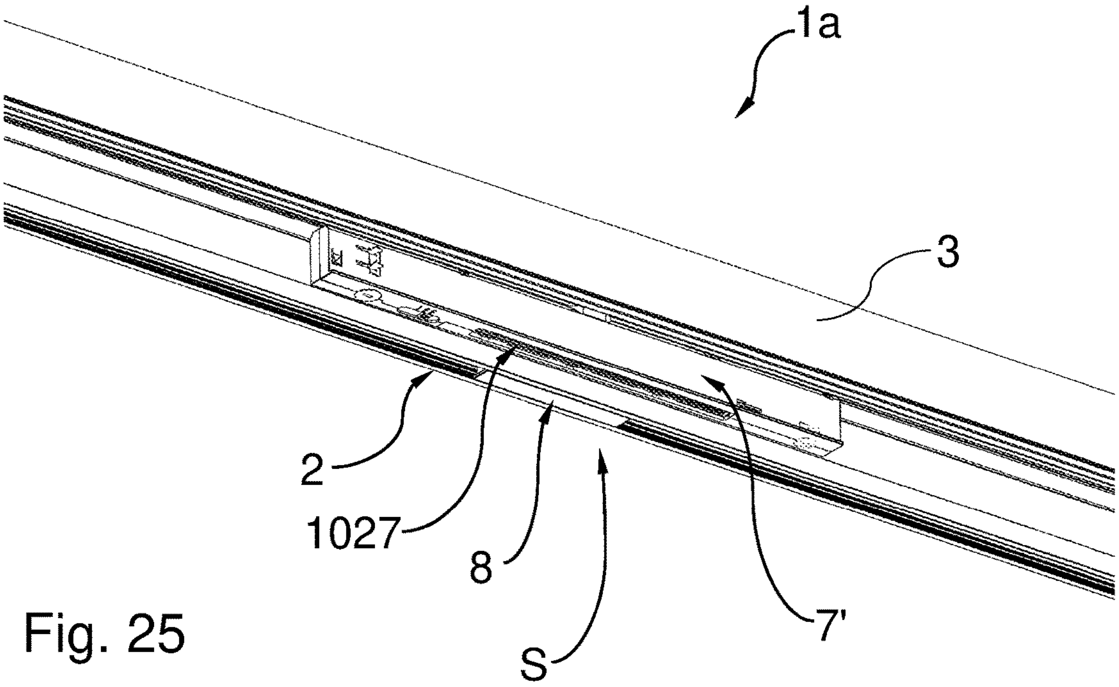
FIG. 25 shows a lighting arrangement according to a variant of the second exemplified embodiment, as seen in a perspective first exploded view from a visible side.
Figure 26:
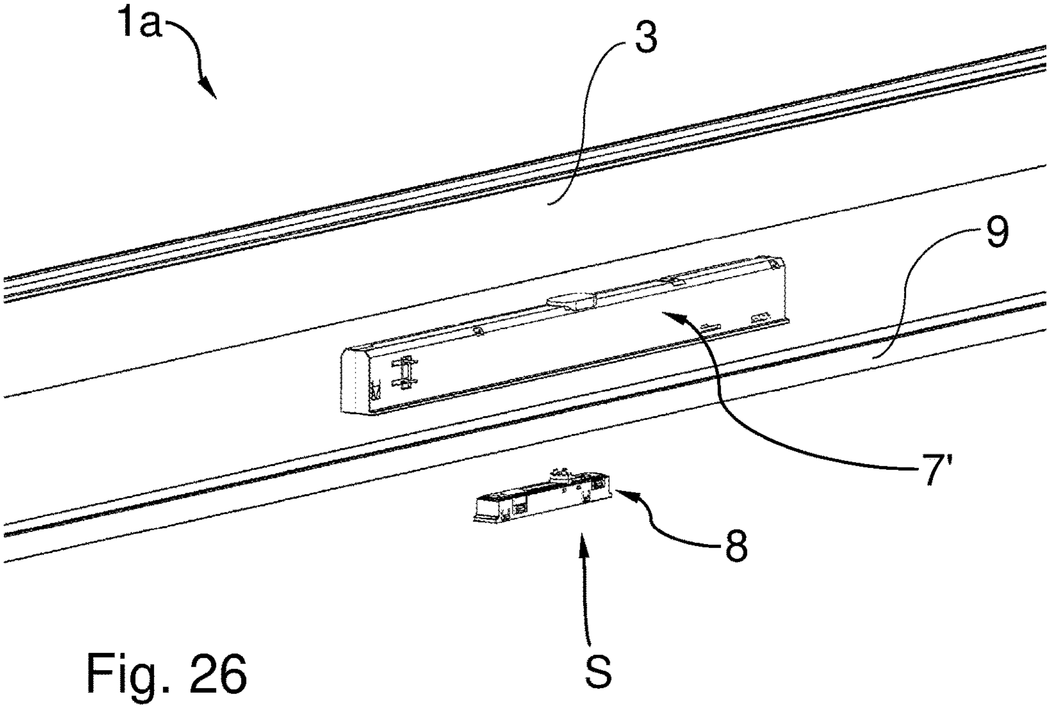
FIG. 26 shows the lighting arrangement of FIG. 25 in a perspective second exploded view.

The contacting section 8*a* in the example of FIGS. 25-31, in contrast to the two-dimensional contacting section 8*a'* in FIG. 24, is formed with a smaller base surface and with a larger projection over the remaining top side of the connecting unit 8, e.g. of a cylinder-like shape, and has the three contact elements 28. An outer contour of the contacting section 8*a* corresponds preferably to an inner cross-sectional shape of the passage-opening 10.

It should also be noted that in FIGS. 25-30 and 32, the adapter unit 7' is provided with a protrusion 7*a'* approximately centrally with respect to the longitudinal axis thereof, and on the top side thereof which, in the mounted state, faces the web 3*a* of the rail profile 3. This can be part of a body and/or housing of the adapter unit 7' and in further exemplified embodiments can be equipped with contact elements, instead of the contact elements 27, wherein, however, in FIGS. 25-30, 32 contact elements are not present on the protrusion 7*a'*. The protrusion 7*a'* could alternatively be omitted from the adapter unit 7'.

Figure 32:
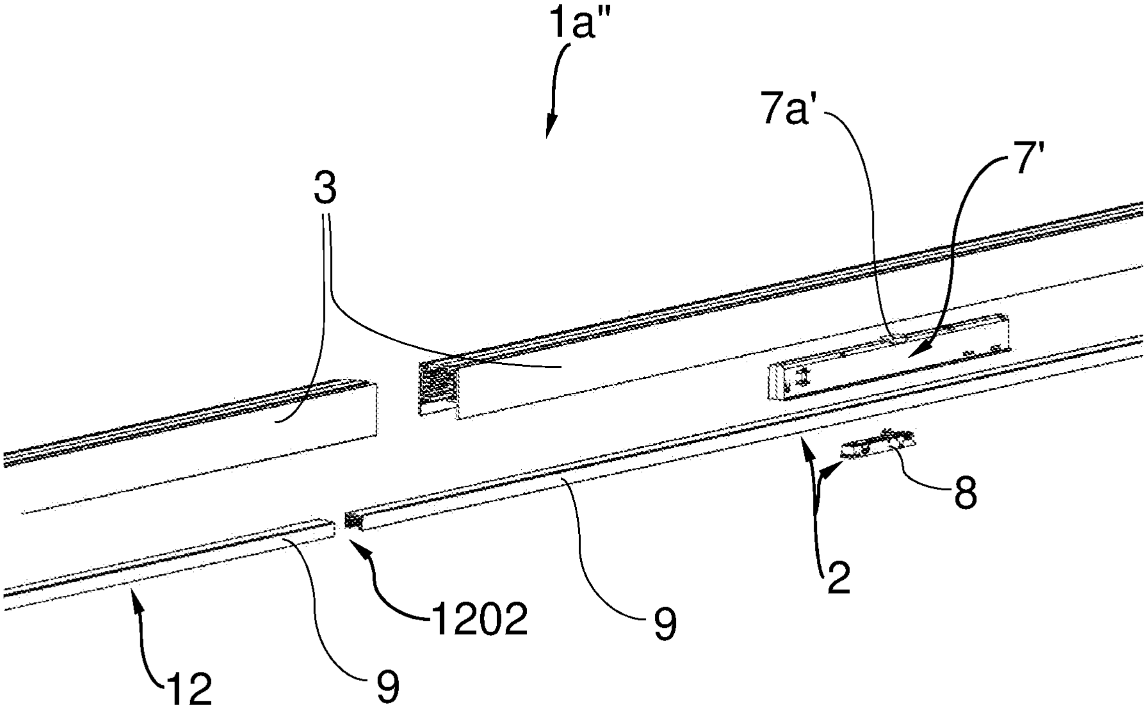
FIG. 32 shows a further variant of the second exemplified embodiment.

In the second exemplified embodiment, at least one further assembly 12 can also be provided in one variant, which is supplied with electrical energy and control signals, which are provided by the adapter unit 7', via the assembly 2. Such a lighting arrangement 1*a''* is illustrated in FIG. 32. Similar to the assembly 2, the assembly 12 in FIG. 32 has a rail 9, to which one or more lighting unit(s), e.g. 211*a*, 211*b* (not shown in greater detail in FIG. 32), can be coupled and/or accommodated by the further rail 9 at least partially. The extension rail 9 of the assembly 12 in FIG. 32 likewise has a conductor device 26 similar to the assembly 2 in FIGS. 23-31. In the region of a joint 1202, the assemblies 2, 12 are coupled to one another in such a manner that the corresponding conductors 26*a*, 26*b* of the two rails 9 are each in electrical contact with one another at the adjacent end-face ends thereof. For this purpose, e.g. suitable designed coupling pieces (not shown in greater detail) can be provided at the joints 1202.

In this way, a plurality of low-voltage rail modules in the form of the assemblies 2, 12—e.g. three such assemblies, for instance one assembly 12 at each end of the assembly 2—can be inserted adjoining one another into the rail profile 3 and can be electrically connected to one another. Unlike the assembly 2, the assembly 12 of FIG. 32 does not have a connecting unit 8 or 8'. Therefore, it is sufficient to couple only a first low-voltage rail module, i.e. the assembly 2 in FIG. 32, electrically to the high-voltage rail 3 via the adapter unit 7' arranged lying thereabove. The low-voltage rail modules 2, 12—whether supplied directly or indirectly by a common adapter unit—are all switched together in the same phase, which can be selected by means of the adapter unit 7'.

Electrical current for supply to the lighting units 211*a*, 211*b* is relayed via the conductors 26*a* at the coupling point 1202. Control signals, e.g. DALI signals, are relayed unchanged at the coupling point 1202 via the corresponding conductors 26*b*, whereby lighting units located on the extension rail 9 of the assembly 12 can also be controlled individually via dedicated addresses.

It is apparent from FIG. 32 that the rail profile 3 can be formed with a plurality of rail profile sections connected to one another at the end face in order to create a longer linear system. Suitable connecting pieces, not illustrated, for the sections of the rail profile 3 can be provided for this purpose. Not every section of the rail profile 3 and not every rail section 9 requires a separate adapter unit 7' in the upper (high-voltage) rail profile inner region 5.

The exemplified embodiment shown in FIGS. 23-32 together with its variants likewise allows, after inserting the adapter unit 7' and the assembly 2 and, if applicable, the assembly 12 into the rail profile 3, a displacement of the assembly 2 or the assemblies 2 and 12, including rails 9 and connecting unit 8 or 8', relative to the adapter unit 7'.

FIGS. 33-37 show a lighting arrangement 1*b* according to a third exemplified embodiment and a variant 1*b*' thereof, which can be fastened in a suspended manner and, in addition to illuminating components for achieving direct lighting, can be equipped with indirect lighting. The lighting arrangement 1*b*, 1*b*' of FIGS. 33-37 can be suspended e.g. from a ceiling of a room or another part of a building or from another construction. Indirect lighting is implemented in the arrangements 1*b* and 1*b*' in the manner described hereinafter.

The lighting arrangement 1*b*, 1*b*' of the third exemplified embodiment comprises a rail profile 3" which, similar to the profile 3 in FIGS. 1-6, 10, 23-32, has a region 4 and an inner region 5, the configuration and function of which are described above. However, the rail profile 3" differs from the rail profile 3 in that in the case of the rail profile 3" an accommodating region 44 is additionally provided on a rear side facing away from the visible side S, and thus on the rear side of the web 3*a*. The accommodating region 44 is formed in the cross-sectional profile of the rail profile 3" as a flat channel facing away from the second region 5. The rail profile 3" is substantially symmetrical to a longitudinal centre plane, except for differing end sections of the longitudinal ribs 3*c*, 3*c*'.

The accommodating region 44 serves as a first region of the rail profile 3" for accommodating an elongated indirect lighting module 40, which can be inserted into the accommodating region 44 and can emit light in the mounted state substantially upwards, e.g. in the direction of the ceiling of the room.

The rail profile 3" in FIGS. 33-37 is equipped with a three-phase, or alternatively a five-phase, conductor device 6 configured for mains voltage, similar to that described above with respect to the profiles 3, 3'. The web 3*a* defines the inner, second region 5 equipped with the conductor device 6 at the top and thus separates the accommodating region 44 from the inner region 5. Towards the top, i.e. to the rear side of the rail profile 3" opposite to the visible side S, this is equipped with one or more passage-openings 50, see FIG. 36, in the web 3*a*.

Furthermore, an adapter unit 7" is provided which can be introduced into the rail profile 3" in a similar manner to the adapter units 7, 7' and which is designed in a similar manner to the adapter units 7, 7' with regard to the basic shape, wherein differences are described hereinafter.

The adapter unit 7" has a contact device 1017*a* with punctiform contact elements 17*a* on the top side of the adapter unit 7". In this case, the contact elements 17*a* are pin-like or pin-head-like and protrude from an upper surface of a protrusion-like contacting section 7*a*" which can be formed substantially like the protrusion 7*a*' of FIG. 32. The contacting section 7*a*" is arranged on the adapter unit 7" substantially centrally in relation to the longitudinal extension of said adapter unit and is provided on the top side of the adapter unit 7" which in the inserted state faces away from the visible side S and faces towards the web 3*a*.

The contacting section 7*a*" can be introduced into the opening 50 for the electrical coupling of the indirect lighting module 40 and the adapter unit 7". Thus, the contact elements 17*a*, see FIG. 33, can protrude through the opening 50 and protrude upwards out of said opening. A body section of the contacting section 7*a*" preferably substantially fills the passage-opening 50, whereby said opening is closed after insertion of the adapter unit 7".

The adapter unit 7", like the adapter unit 7, 7', with a corresponding selection or introduction of the opening 50, can be positioned fundamentally freely along the rail profile 3", but can no longer be displaced longitudinally after the contacting section 7*a*" has been passed through the opening 50.

The first indirect lighting module 40 which can be displaceably inserted thereabove in the rail profile 3" has a double-sided printed circuit board 41 ("PCB") which can be electrically coupled on its underside to the protruding contact elements 17*a* of the adapter unit 7" via a contact device 1047 having web-shaped or strip-like contact elements 47. Further indirect lighting modules can each be inserted into the accommodating region 44 as an extension indirect lighting module 40*a* on the end face adjoining the first indirect lighting module 40 and can be connected to the first indirect lighting module 40 according to a master/slave principle, wherein the indirect lighting module 40 can be considered to be the "master". The connection can be established by means of connecting devices, not shown in greater detail, at a joint 4040, see FIG. 37. The further indirect lighting modules 40*a* or "slaves" can have an at least single-sided printed circuit board instead of the double-sided printed circuit board 41, which can contribute to cost savings and simplified manufacturing.

An electrical supply to the indirect lighting module 40*a* is effected via the indirect lighting module 40, wherein, as in the case of the first exemplified embodiment, a low voltage for the operation of the indirect lighting modules 40, 40*a* is provided by the adapter unit 7" which includes a converter. The electrical phase to be used for the supply of power to the indirect lighting modules 40, 40*a* can also be selected by means of the adapter unit 7".

The control of the indirect lighting modules 40, 40*a* is made possible in a similar manner as with the direct lighting modules 11, 11*a* or 11', 11*a*', wherein the indirect lighting modules 40, 40*a* are addressed via a common address, e.g. a DALI address, and are controlled together. The control signal provided at the conductors 26*b* of the conductor device 6 is interpreted by devices in the adapter unit 7" or alternatively by devices on the board 41 of the "master" indirect lighting module 40 and, based thereon, an output signal is generated for the control, wherein the contact device 1017*a* is designed e.g. for communicating the output signal generated on the basis of the interpretation of the control signal in the adapter unit 7" or for relaying the control signal received by the adapter unit 7" from the conductor device 6. In both cases, the output signal resulting from the interpretation is transferred at the joint 4040. The output signal can be converted e.g. by means of a pulse-width modulation or pulse-pause modulation.

The supply to and control of the indirect lighting module 40 can be achieved in a simple and quick manner. A comparatively small passage-opening 50 is introduced into the web 3*a* in the region of the top side of the rail profile 3". The opening 50 can either be pre-produced or flexibly introduced at the construction site. The freely placeable adapter 7" which can initially be displaced with folded-in contact elements 13 is then positioned in the rail profile 3" under the recess 50. Indirect lighting modules 40 can then be inserted e.g. quickly, variably and flexibly without much effort. In addition, the indirect lighting module 40, and optionally further indirect lighting modules 40*a* as "slaves", can still be displaced in the longitudinal direction L relative to the adapter unit 7" when an electrical coupling is provided. For example, a further module 40*a* can be provided at each end of the module 40, wherein an indirect lighting strip of greater length is likewise feasible.

Figure 34:
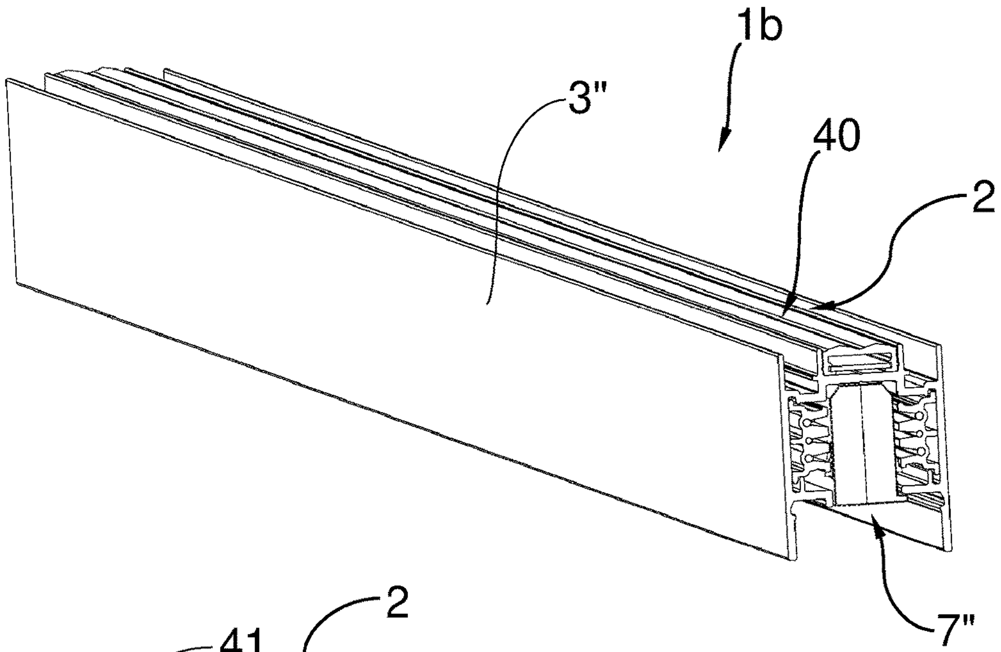
FIG. 34 shows the components of FIG. 33 in a state mounted on one another, as seen in perspective from a rear side of the lighting arrangement facing away from the visible side.
Figure 36:
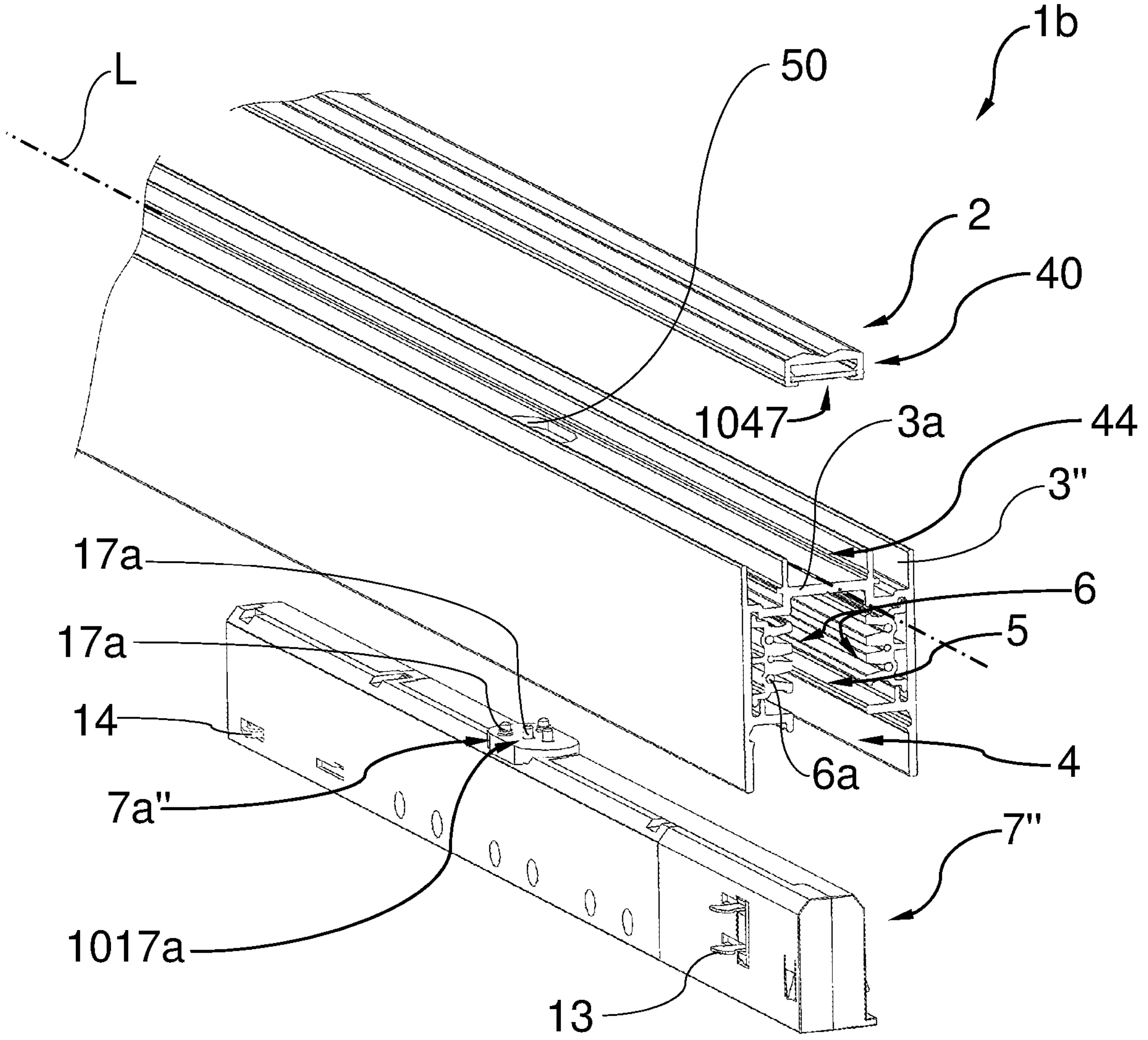
FIG. 36 shows some of the components in FIG. 33 in a perspective exploded view from the rear side.
Figure 37:
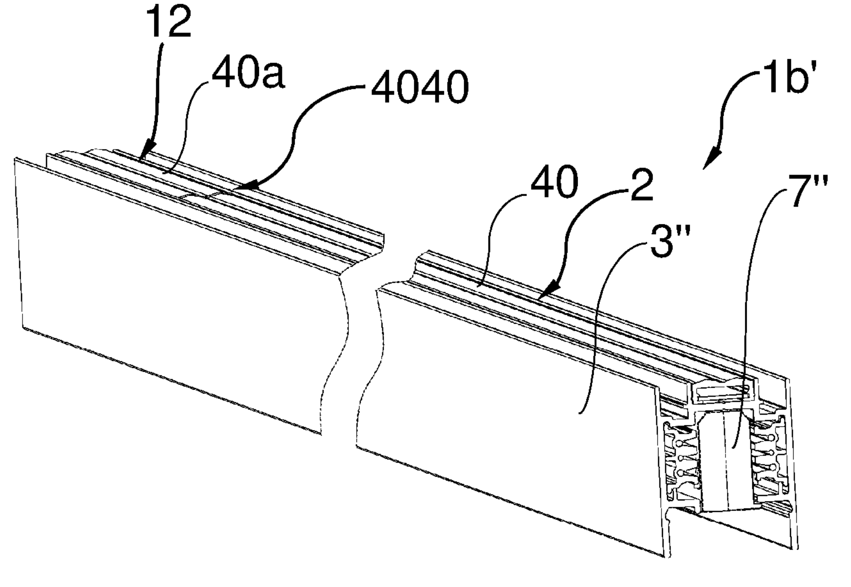
FIG. 37 shows a variant of the third exemplified embodiment, illustrated in a similar manner to FIG. 34.

The adapter unit 7" is thus configured to supply the indirect module 40 and optionally further indirect modules 40*a* in the accommodating region 44 as "slaves". In addition to the adapter unit 7", in FIGS. 33-37 a further adapter unit 7, which is not visible in FIGS. 34, 36, 37, is accommodated in the second region 5 of the rail profile 3" and is designed as described for the first exemplified embodiment. By means of the further adapter unit 7, one or more linear lighting modules 11, 11*a* can be supplied as assemblies 2, 12 in a similar manner to FIGS. 1-10 in order to also implement direct lighting by means of the lighting arrangement 1*b*, 1*b*', i.e. in particular starting from the visible side S into the room region located therebelow. With such an arrangement 1*b*, 1*b*', continuous direct and indirect lighting strips can be produced e.g. simultaneously and can be displaced separately along the rail 3".

Figure 33:
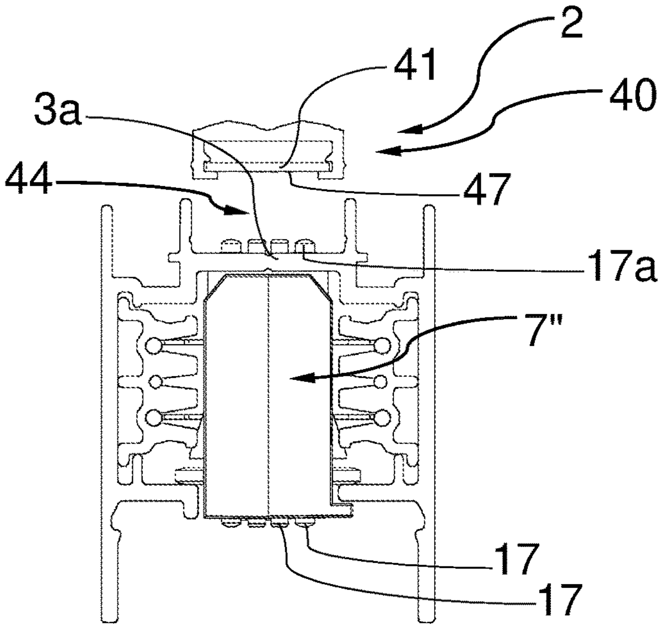
FIG. 33 shows some components of a lighting arrangement according to a third exemplified embodiment, in a state partially mounted on one another, in an end-face view.
Figure 35:
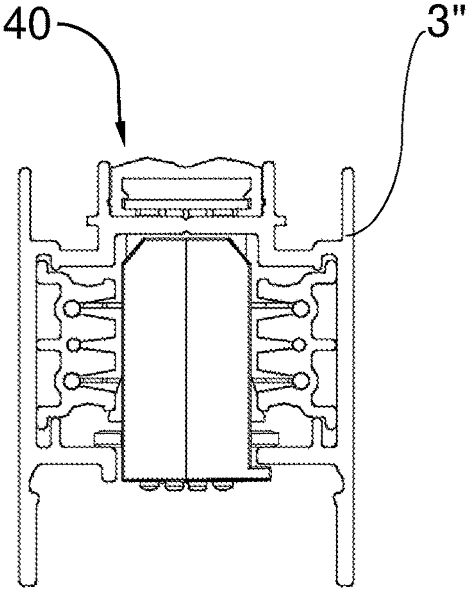
FIG. 35 shows the situation of FIG. 34 in an end-side view.

FIGS. 33, 35 show the end face of the rail profile 3" with, by way of example, two inserted adapter units 7, 7"—of which one is for direct modules and one is for indirect modules—wherein, with the exception of the contact elements 17, only the foremost adapter unit 7" is visible and conceals the adapter unit 7 arranged therebehind.

As in the case of the first and second exemplified embodiment, in the third exemplified embodiment the region 4, which is provided for accommodating, at least partially and preferably substantially completely, the assembly(ies) 2, 12, which are configured preferably for direct lighting, is formed as a front-side region 4 of the rail profile 3" when the lighting arrangement 1*b*, 1*b*' is in the usage state. The front side of the lighting arrangement 1*b* or 1*b*' corresponds to the visible side S thereof, in particular the underside thereof in a mounted state.

The accommodating region 44 for accommodating, at least partially, preferably substantially completely, the indirect lighting module 40 as well as optionally the extension indirect lighting module 40*a* is formed as a rear-side region 44 of the rail profile 3". The accommodating region 44, referred to here as the first region, and the second region 5 are thus arranged on different sides of the web 3*a*, wherein the second region 5 is provided between the web 3*a* and the region 4. The rear-side first region 44 and the second region 5 are thus adjacent to one another in the third exemplified embodiment and in this case are delimited from one another by means of the web 3*a*.

It should be mentioned that the contact devices 1017*a*, 1047 described above with respect to the third exemplified embodiment enable simple and quick, displaceable electrical coupling which advantageously requires little effort and time during mounting and is also space-saving.

However, in one variant the contact devices 1017*a*, 1047 can be replaced by a cable connection similar to that described above with respect to FIG. 44, wherein a sufficient cable length is provided in order to enable the indirect lighting module 40 and optionally the extension indirect lighting module 40*a* to be displaced relative to the inserted adapter unit.

The exemplified embodiments described above show some possibilities of constructing a lighting arrangement based on the rail lighting system described above, wherein the different assemblies, lighting modules, lighting units, indirect lighting modules, and rail profiles described above can be combined in many ways in order in each case to meet the lighting requirement in different applications.

In particular, the indirect lighting module(s) 140, 140*a* of FIGS. 33-37 can be combined in a versatile manner with the direct lighting modules 11, 11*a*, 11', 11*a*' or lighting units 211*a*, 211*b* described with reference to FIGS. 1-32. For example, it is possible in this manner to provide both directly and indirectly illuminating lighting strips which independently of each other in the inserted state have a displaceability with respect to the respectively provided adapter unit 7" or 7 or 7'.

Figure 19:
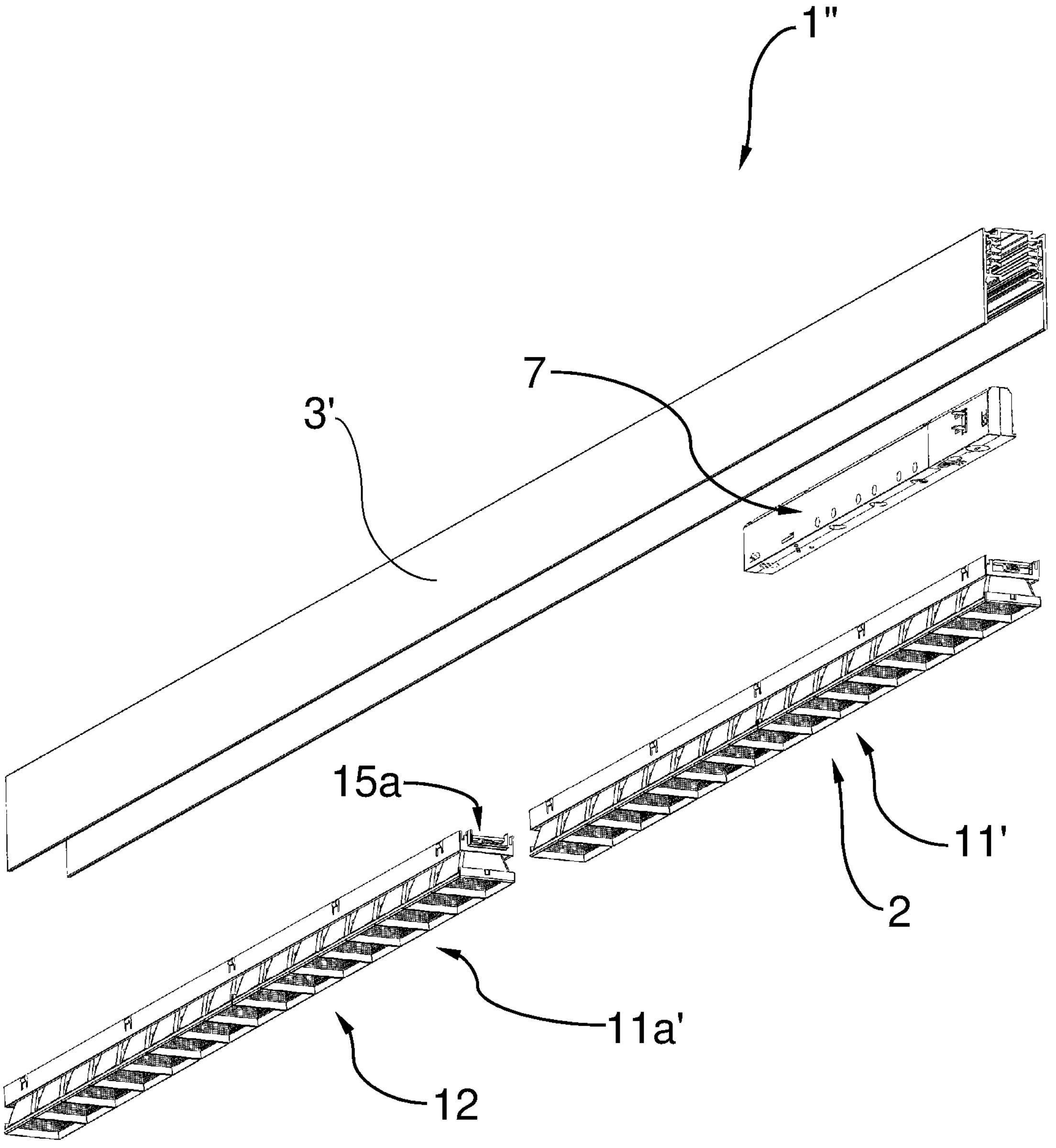
FIG. 19 shows a further variant of the lighting arrangement according to the first exemplified embodiment, in which lighting modules having reflectors are provided, as seen in a perspective view from the visible side.
Figure 20:
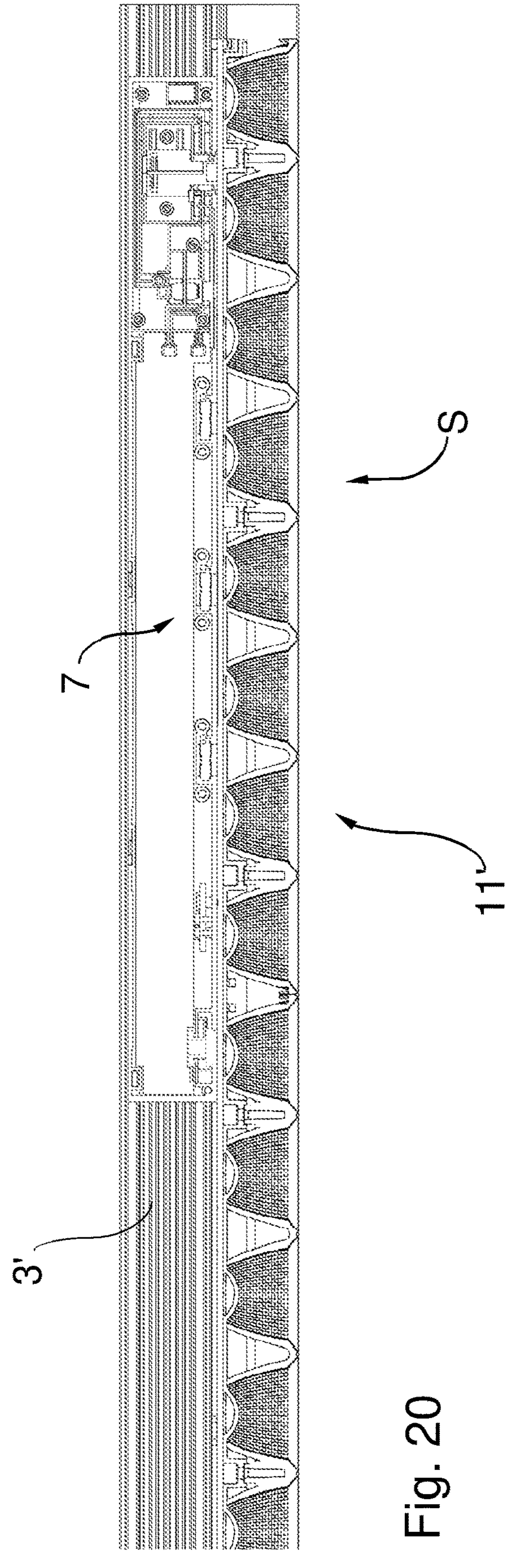
FIG. 20 shows a section of the arrangement of FIG. 19, mounted, in a longitudinal section.

As described above, a dedicated adapter unit is not necessary for extension rails 9, see FIG. 32, or extension modules 11*a*, 11*a*', 40*a*, see FIGS. 10, 19 and 37.

However, a specifically provided adapter unit is preferably provided in each case for the differently designed assemblies 2, 12. For the lighting modules 11, 11*a*, 11', 11*a*', for the low-voltage rails 9 with lighting units 211*a*, 211*b*, and for the indirect lighting by means of the indirect lighting modules 40, 40*a*, the rail lighting system provides a specifically configured adapter unit 7, 7', 7" in each case. In particular with regard to the basic shape and dimensions as well as the fastening in the second region 5 and the contacting with the conductor device 6, the adapter units 7, 7', 7" are designed substantially similarly.

Therefore, a first adapter unit 7" is used preferably e.g. for a lighting arrangement having indirect lighting modules 40, 40*a* and a second, independent adapter unit 7 e.g. next to the first adapter unit 7" is used for additional directly illuminating lighting modules 11, 11*a* or 11', 11*a*' in the rail profile. In order to combine the indirect lighting modules 40, 40*a* with an assembly 2 with the low-voltage rail 9, a second adapter unit 7' can be used in a similar manner in addition to the adapter unit 7". This makes it possible to flexibly combine different direct or indirect illuminating components and at the same time the complexity of the adapter units 7, 7', 7" in terms of electrical and control technology is limited.

Furthermore, the rail system can provide an adapter unit, not illustrated in greater detail in the figures, for spot lamps or spotlights, likewise not illustrated in greater detail, wherein such an adapter unit, with the exception of the absence of the contact elements 17, is configured e.g. substantially as in FIGS. 1-22 and additionally is equipped on the underside thereof facing the visible side S with a coupling device for mechanically and electrically coupling the spotlight to the adapter unit. In this case, the spotlight cannot be displaced with respect to the adapter unit. For such spotlights, mechanical fastening in the rail profile 3, 3' or 3" is achieved via the connecting element to the adapter unit as well as the mechanical fixing of the latter in the second region 5.

Alternatively, it is feasible e.g. on an adapter unit, for instance the adapter unit 7", to simultaneously provide contact elements 17*a* for supplying an indirect lighting module and contact elements 17 for supplying modules 11, 11*a*, 11', 11*a'*. Similarly, it would be feasible to provide contact elements 17*a* for an indirect module 40 on the adapter unit 7'. In such a modification, only one adapter unit is required instead of two, although it is constructed in a more complicated manner in terms of electrical and control technology, particularly if direct and indirect lighting are to be controlled independently of one another.

The adapter units 7, 7" described above can each be equipped with different numbers of contact elements 17 or 17*a*. For example, the adapter unit 7 or 7" could have three or four punctiform contact elements 17 or 17*a*, wherein a corresponding number of contact elements 18 or 47 can then be provided.

For example, three pin contacts 17 or 17*a* can be used in some variants of the exemplified embodiment which serve to provide the possibility of a so-called "Tunable White", wherein the pin contacts 17, 17*a* provide positive and negative current contacts for this purpose. In this case, the contact elements 17, 17*a* can have the following configuration: first contact element positive (cold); second contact element positive (warm); third contact element negative.

In one variant, in which the "Tunable White" option is not available, it may be sufficient to provide the adapter units 7, 7" each with only two contact elements, with the configuration: first contact element positive, second contact element negative.

Therefore, a rail lighting system is described above which enables combinable accommodation of displaceable spotlights, lighting modules and low-current rails which themselves can accommodate further lighting units, in particular in a displaceable manner, in a three-phase or five-phase rail.

A lighting arrangement 100 according to a fourth exemplified embodiment and a variant 100' thereof are shown in FIGS. 38-43. The lighting arrangement 100 comprises a rail 109, at least one indirect lighting module 140 for providing indirect lighting, and an adapter or coupling unit 108.

Figure 38:
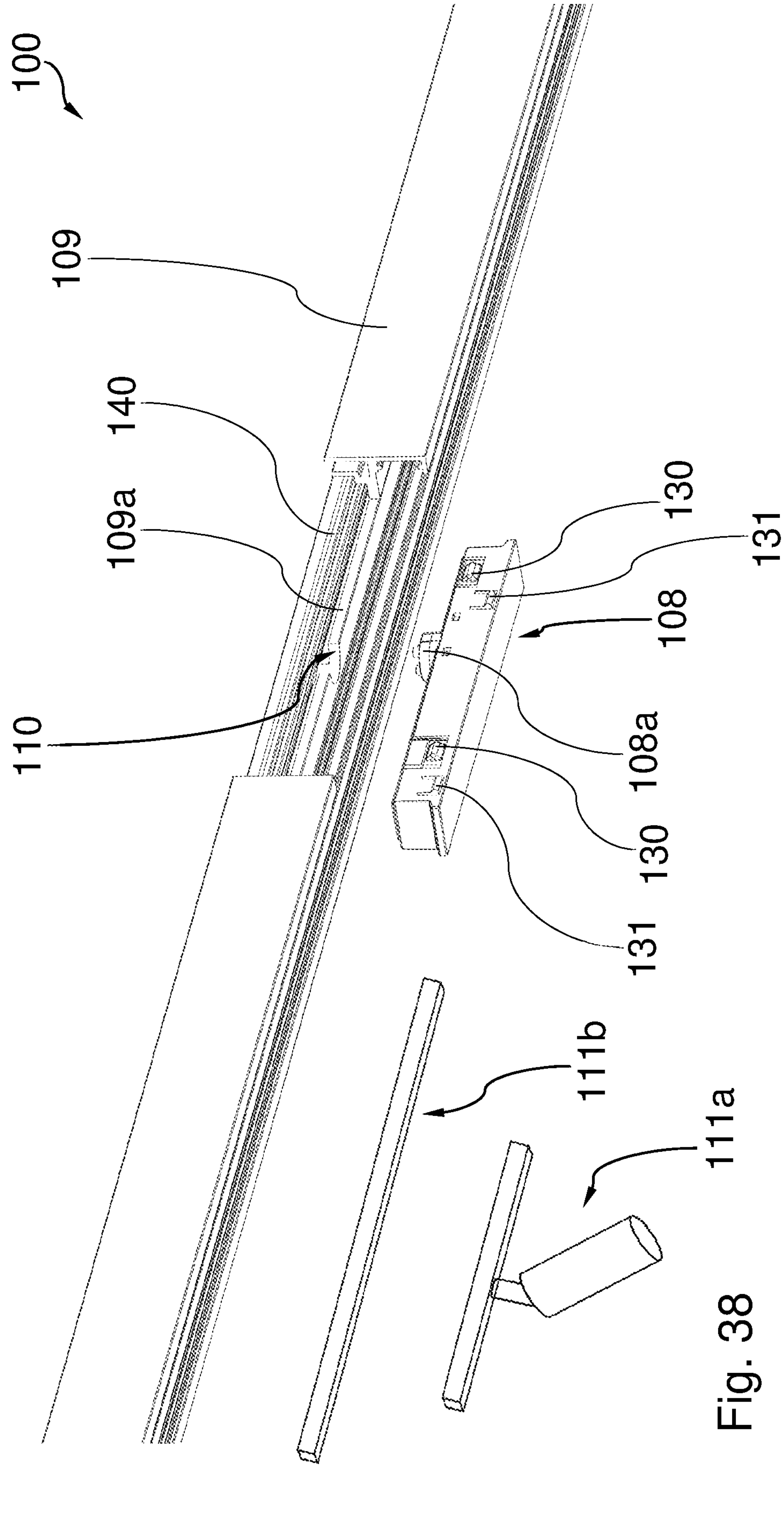
FIG. 38 shows a lighting arrangement according to a fourth exemplified embodiment, as seen partially in an exploded view and partially cut away, from a visible side.

The rail 109 is designed for coupling and/or accommodating, at least partially, one or more lighting units 111*a* and/or 111*b* which are illustrated schematically in FIG. 38 and can be of a different type, for example can be designed as linear modules 111*b* or spots 111*a*.

Figure 42:
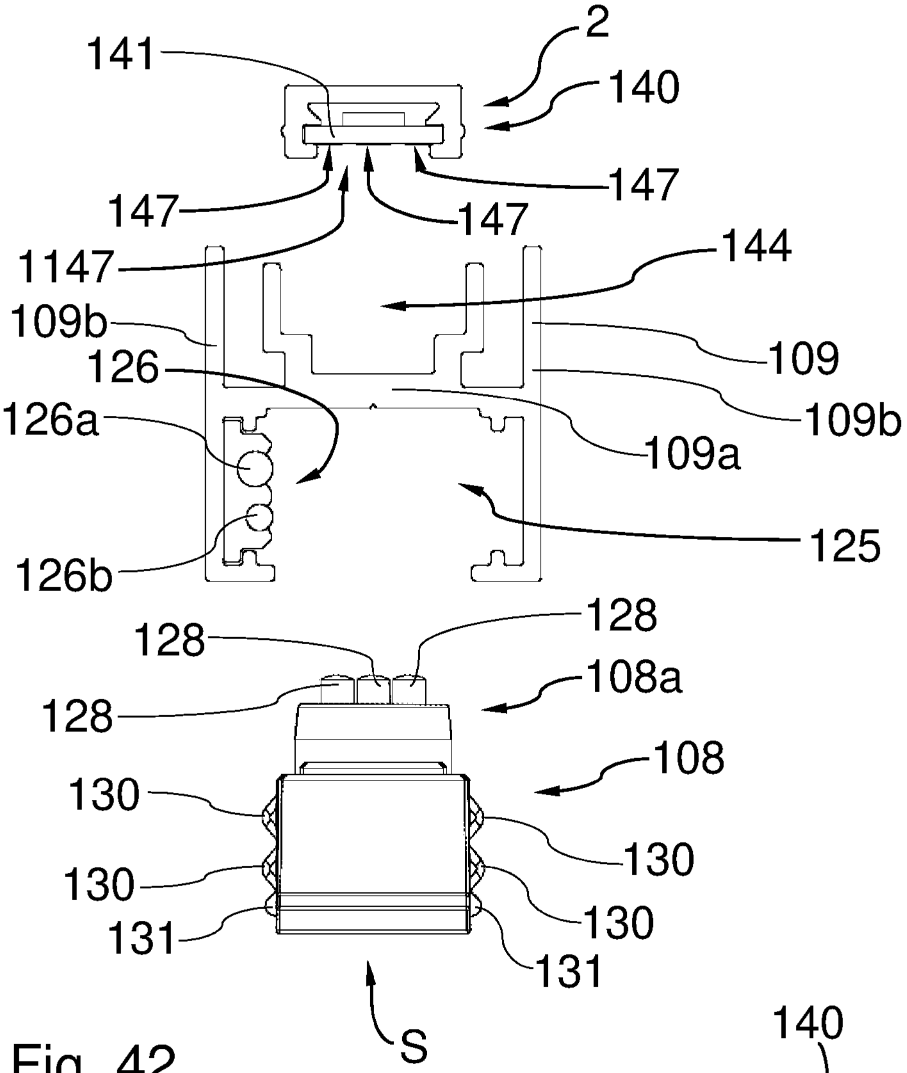
FIG. 42 shows an end-face exploded view of the lighting arrangement of FIG. 38.
Figure 43:
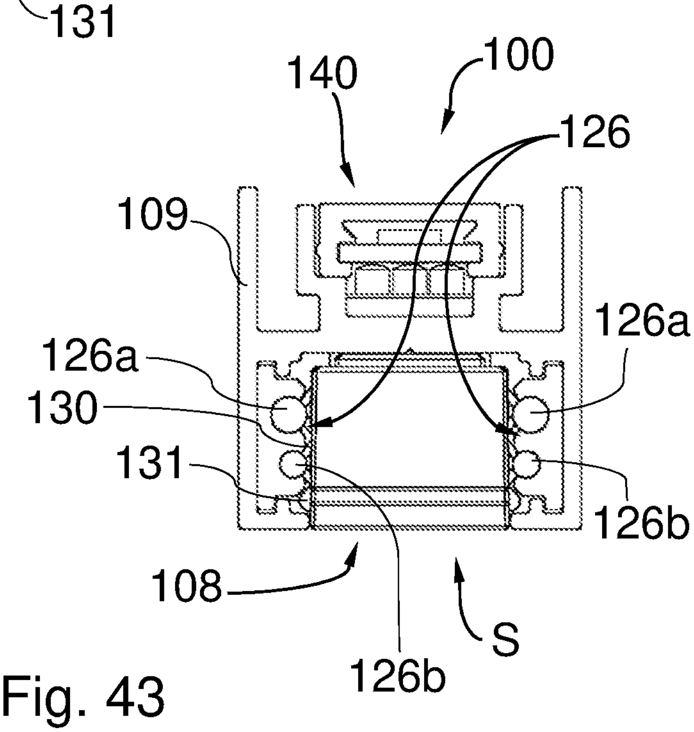
FIG. 43 shows an end-face view of the lighting arrangement of FIG. 38 in the mounted state.

The rail profile 109 has a first region 144 and a second region 125, see the cross-sectional view of FIG. 42. In the inner region 125, the lower one in FIG. 42, a conductor device 126 is provided along the rail 109 for providing at least electrical energy for supplying the lighting unit(s) 111*a*, 111*b*. The conductor device 126 extends in parallel with a longitudinal direction L' of the rail profile 109. FIGS. 42, 43 show that the conductor device 126 is designed having two conductor rails, each with two conductors 126*a*, 126*b*, of which one conductor rail is on each side of the inner region 125 laterally within the same, wherein the conductors 126*a* serve to provide the electric current and the conductors 126*b* serve to provide a control signal, for instance a DALI signal, wherein a control signal based on e.g. another protocol or dimming method is likewise feasible. If e.g. a control signal is not desired, the conductor device 6 could alternatively be designed having only one conductor rail on one side, and with a total of two conductors.

The rail 109 is designed as a low-voltage or low-volt rail, e.g. for supplying energy to the lighting units with a direct voltage of less than 60V, e.g. 48V, which is fed into the conductor device 126 by a feed unit, not shown.

The adapter unit 108 may also be referred to as a coupling or connecting unit, serves to electrically couple the conductor device 126 to the indirect lighting module 140, can be inserted into the inner region 125 of the rail 109 and can be coupled to the rail 109. When the coupling unit or adapter unit 108 is in the inserted state, the conductors 126*a*, 126*b* are arranged laterally of the unit 108.

Figure 39:
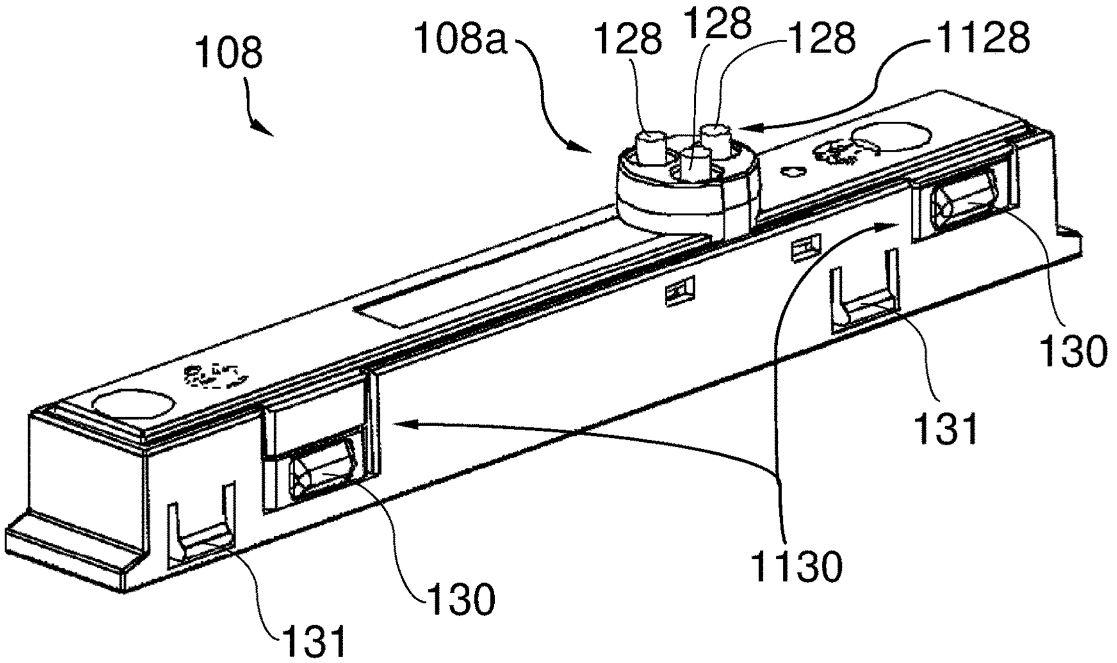
FIG. 39 shows a coupling or adapter unit of the lighting arrangement of FIG. 37.
Figure 40:
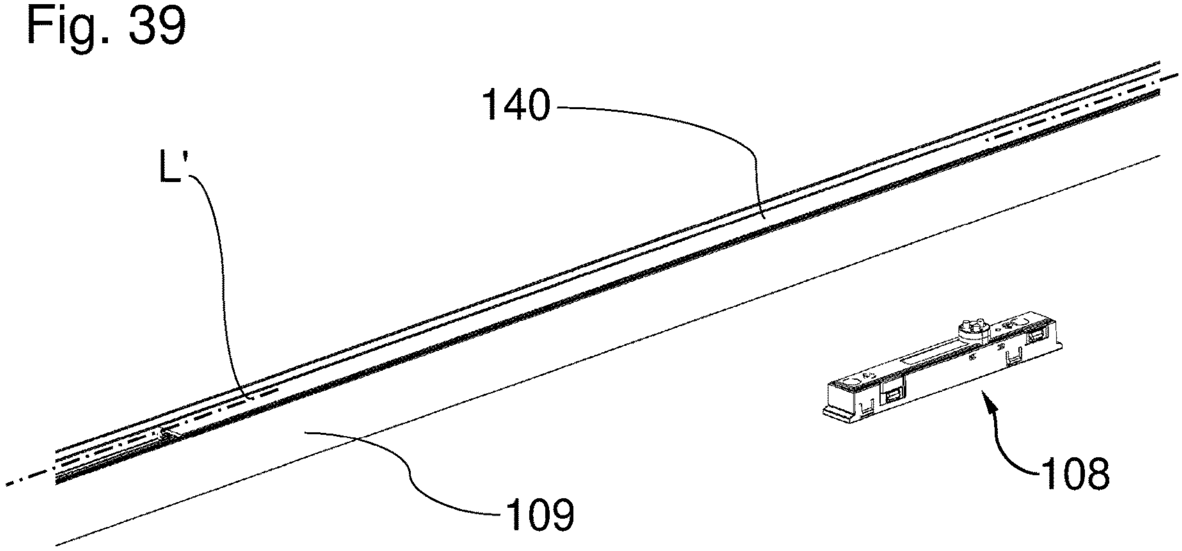
FIG. 40 shows the lighting arrangement of FIG. 38 in a further perspective view, as seen from a rear side.

The coupling unit or adapter unit 108 shown separately in FIG. 39 has a first contact device 1130 with contact elements 130 arranged on the longitudinal sides of the unit 108. The contact elements 130 are arranged and configured to make electrically conductive contact in each case with one of the conductors 126*a*, 126*b*. In addition, the coupling unit 108 has, on the longitudinal sides thereof, elastically resilient latching elements 131, by means of which the unit 108 can be clipped into the rail 109 for mechanical coupling thereof to the rail 109 from the visible side S thereof.

The adapter unit 108 is thus configured to tap current from the conductors 126*a* and preferably also control signals from the conductors 126*b* at the side of the conductor device 126 by means of the contact elements 130, to divert them upwards by 90° and to make them available to the indirect lighting module 140.

A cross-sectional shape of the rail 109 is formed having a web 109*a* and side walls or flanges 109*b*, wherein the web 109*a* extends between the flanges 109*b*. The web 109*a* defines the inner, second region 125 of the rail 109 which is equipped with the conductor device 126.

The rail 109 is fastened in a suspended manner to form the lighting arrangement 100, e.g. in a building, e.g. by suspending the rail 109 from a ceiling, from another part of the building, or from another construction.

The first region 144, hereinafter also referred to as the accommodating region 144, is arranged on a rear side of the rail 109 which, in the mounted state, faces away from a visible side S of said rail, and thus on the rear side of the web 3*a*. The accommodating region 144 is formed in the cross-sectional profile of the rail 109, in particular as an upper part of a channel facing away from the web 109*a* and the inner region 125. The channel has two sections of different width starting from the opening thereof towards the web 109*a* and is of smaller width by reason of inwardly protruding, lateral steps towards the web 109*a*.

The accommodating region 144 serves to accommodate an assembly 2 designed as an elongated indirect lighting module 140, which can be inserted—in FIGS. 42, 43 from above—into the accommodating region 144. In the mounted state, the indirect lighting module 140 inserted into the first region 144 can emit light upwards, e.g. in the direction of the ceiling of the room.

In order to supply electrical current and preferably control signals to the indirect lighting module 140, the unit 108 has a contacting section 108*a*. The rail 109 is provided with a passage-opening 110 in the region of the web 109*a*, see FIG. 38. When the coupling unit 108 is inserted into the rail 109, the contacting section 109 is inserted into the passage-opening 110 such that the upper part of the contacting section 108*a* passes through the passage-opening 110 to supply electrical current and preferably also control signals to the indirect lighting module 140.

The indirect lighting module 140 has a double-sided printed circuit board 141. Elongated strip-like contact elements 147 of a contact device 1147 of the module 140, which extend in parallel with the longitudinal direction L' and are designed as tracks, are formed on a main surface of the printed circuit board 141 facing the web 109*a* in the state in which it is inserted into the accommodating region 144. On the other, opposite main surface, the printed circuit board 141 is provided with light-generating devices which are designed preferably as LEDs.

A second contact device 1128 is arranged on the contacting section 108*a* of the adapter unit 108 and has a plurality, in the example shown three, punctiform, pin-shaped or pin-head-like contact elements 128 which protrude from an upper surface of the contacting section 108*a* in the mounted state, see FIG. 39.

During insertion of the unit 108, the second contact device 1128, comprising the contact elements 128, makes electrically conductive contact with the contact device 1147 of the indirect lighting module 140, comprising the contact elements 147. In particular, in this case each contact element 128 contacts one of the web-like contact elements 147.

Therefore, complex cabling of the indirect lighting module 140 is not necessary in the described embodiment with the cooperating contact devices 1128, 1147, the electrical coupling of the conductor device 126 to the indirect lighting module 140 is possible in a simple and time-saving manner. The passage-opening 110 which is relatively small in size can be pre-produced in the rail 109 or flexibly inserted on the construction site. Then, the indirect lighting module 140, and optionally further indirect lighting modules 140*a*, see the variant of FIG. 41, can be inserted quickly, variably and flexibly without much effort.

In addition, the punctiform contact elements 128 can slide on the web-like contact elements 147 in the contacting state, whereby the indirect lighting module 140 in the inserted state can be displaced relative to the coupling unit or adapter unit 108.

Figure 41:
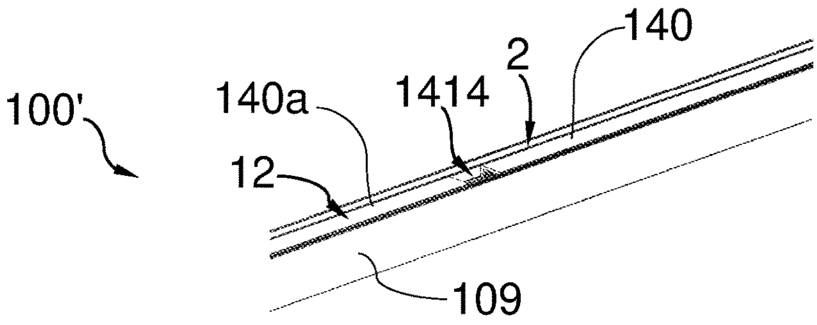
FIG. 41 shows a portion of the lighting arrangement of FIG. 38, in one variant.

FIG. 41 illustrates that in a lighting arrangement 100' according to one variant, the indirect lighting module 140 can form a first indirect lighting module 140 which can be electrically coupled to at least one extension indirect lighting module 140*a*. For this purpose, the extension indirect lighting module 140*a* can be inserted into the accommodating region 144 in the same way as the indirect lighting module 140. In this way, a joint 1414 is formed between the modules 140, 140*a*, which is not yet completely closed in FIG. 41. At the joint 1414, the modules 140 and 140*a* can be electrically coupled to one another in order to likewise supply electrical energy to the extension indirect lighting module 140*a* via the indirect lighting module 140 by means of the unit 108.

The modules 140 and 140*a* are controlled and operated according to a master-slave operation, wherein the module 140*a* as "slave" is subordinate to the module 140 as "master". In other words, the control of the extension indirect lighting module 140*a* is effected according to those control signals which the first indirect lighting module 140 receives from the adapter unit 108 and according to which the first indirect lighting module 140 is controlled and operated.

In the case of the exemplified embodiment of FIGS. 38-43, the preferably double-sided printed circuit board 141 ("PCB") of the first indirect lighting module 140 not only enables the supply of power to the module 140, but also interprets control signals which are relayed via the contact devices 1130, 1128 and 1147 from the conductor device 126 via the unit 108 to the first module 140, and thus enables control, e.g. dimming. Via the end-face coupling with the module 140*a*, the module 140*a* ("slave") is also activated like the module 140. The control signal relayed by the conductors 126*b* is evaluated by means of devices of the first indirect lighting module 140 ("master"), wherein by means of these devices an output signal is generated based on the control signal, said output signal being used by the module 140 to control the same and is also relayed at the joint 1414 to the extension module 140*a* for control thereof. The output signal is e.g. a signal correlating with the dim level, e.g. based on pulse-width modulation or pulse-pause modulation. The modules 140, 140*a* can thus be controlled via a common address.

The further extension indirect lighting module(s) 140*a* can be attached to the module 140 so as to be connectable according to the above-described master/slave principle and therefore do not require a dedicated coupling unit. It is feasible to have at least one extension module 140*a* at each end of the module 140.

Figure 13:
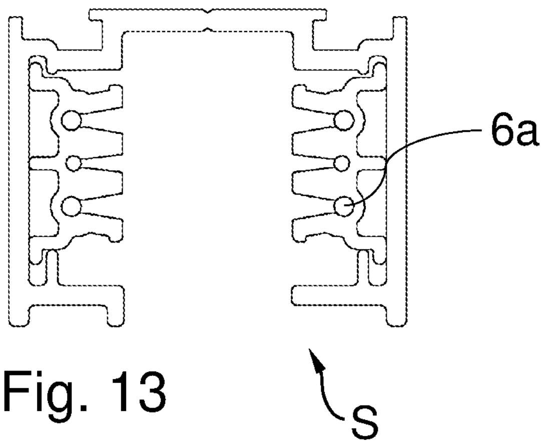
FIG. 13 shows a variant of a rail profile, together with a conductor device, in a sectional view.
Figure 14:
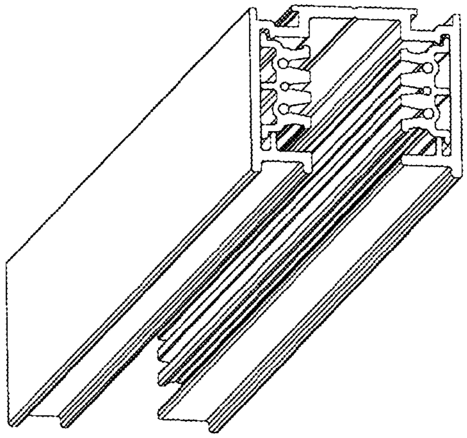
FIG. 14 shows the rail profile of FIG. 13 in a perspective view.
Figure 15:
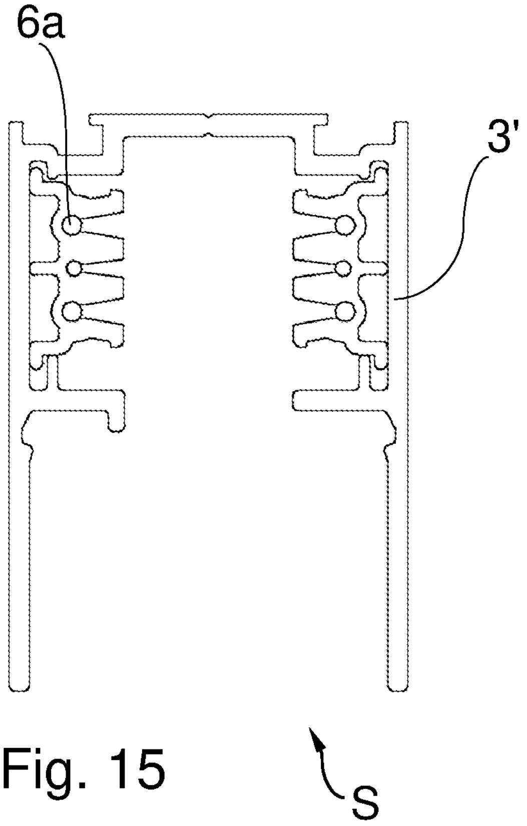
FIG. 15 show further variants of a rail profile, shown in each case with a conductor device, in a sectional view.

The rail profiles 3, 3', 3", and those of FIGS. 13, 14, 16, and the rails 9, 109, can each be extruded e.g. from a metal material, in particular an aluminium material.

Although the use of cabling 700 for electrical coupling has been described above only with reference to FIG. 44, it should be noted that cabling 700 is also similarly feasible in the other exemplified embodiments described above as an alternative way of displaceable electrical coupling. While punctiform contact elements which can be slidingly displaced on strip-like or web-shaped contact elements, as described above, enable particularly simple and quick mounting, the alternative use of a cable 700 can be particularly cost-effective and at the same time enable the displaceable electrical coupling of the adapter unit 7, 7', 7", 7'" and the assembly, or the adapter unit or coupling unit 108 and the assembly, with little effort in the exemplified embodiments described above.

Although the invention has been described in full above with the aid of preferred exemplified embodiments, it is not limited thereto but can be modified in diverse ways.

LIST OF REFERENCE SIGNS

1, 1', 1", 1'" lighting arrangement
1*a*, 1*a'*, 1*a"* lighting arrangement
1*b*, 1*b'* lighting arrangement
2 assembly
3, 3', 3" rail profile
3*a* web
3*b* flange
3*c*, 3*c'* longitudinal rib
4 first region
4*a* recess
5 second region
6 conductor device
6*a*, 6*b* conductor
7, 7', 7", 7'" adapter unit
7*a'* protrusion
7*a"* contacting section
7*v* protrusion
8, 8' connecting unit
8*a*, 8*a'* contacting section
9 rail
9*a* web
9*b* inner region
10, 10' passage-opening
11, 11' lighting module
11*a*, 11*a'* further lighting module
11L lens
12 further assembly
1202 joint
13 contact element
14 engagement element
15, 15*a, b* device
16 latching device
17 contact element
17*a* contact element

18 contact element
21 double-sided printed circuit board
21' single-sided printed circuit board
25 inner region
26 conductor device
26*a*, 26*b* conductor
27 contact element
28 contact element
30 contact element
31 latching element
40 indirect lighting module
40*a* extension indirect lighting module
4040 joint
41 printed circuit board
44 accommodating region
47 contact element
50 passage opening
100, 100' lighting arrangement
108 adapter unit or coupling unit
108*a* contacting section
109 rail
109*a* web
109*b* flange
110 passage-opening
111*a*, 111*b* lighting unit
125 inner region
126 conductor device
126*a*, 126*b* conductor
128 contact element
130 contact element
131 latching element
140 indirect lighting module
141 printed circuit board
144 accommodating region
147 contact element
140*a* extension indirect lighting module
1414 joint
211*a*, 211*b* lighting unit
700 cable
L, L' longitudinal direction
S visible side

The invention claimed is:

1. Lighting arrangement, comprising:

an assembly, wherein the assembly is designed as a lighting module or wherein at least one lighting unit can be coupled to the assembly and/or can be accommodated at least partially by the assembly;

a rail profile having a first region for accommodating the assembly at least partially and having a second region, in which, along the rail profile, a conductor device for providing at least electrical energy is provided; and an adapter unit which can be accommodated in the second region of the rail profile at least partially and is configured to be electrically coupled to the conductor device in the second region, to receive electrical energy from the conductor device and to provide electrical energy to the assembly for supplying the lighting module or the lighting unit;

wherein the adapter unit and the assembly are configured for electrical coupling to each other in such a way that the assembly is displaceable relative to the adapter unit, which is inserted into the second region of the rail profile, along a longitudinal direction of the rail profile, wherein the assembly has, on one side thereof which faces the adapter unit when the adapter unit and the assembly are inserted into the rail profile, strip-like contact elements that can be brought into electrically conductive contact with associated contact elements of the adapter unit.

2. Lighting arrangement as claimed in claim 1, wherein the assembly is provided for the provision of direct lighting or for the provision of indirect lighting.

3. Lighting arrangement as claimed in claim 1, wherein the lighting arrangement also has at least one further assembly which is designed as a lighting module or to which at least one lighting unit can be coupled and/or by means of which at least one lighting unit can be accommodated at least partially, wherein the assembly and the further assembly are configured for electrical coupling to one another in such a way that the further assembly can be supplied via the assembly at least with electrical energy provided by the adapter unit.

4. Lighting arrangement as claimed in claim 1, wherein the assembly is designed as a linear lighting module.

5. Lighting arrangement as claimed in claim 1, wherein the strip-like contact elements extend with the longitudinal direction thereof in the inserted state of the assembly along the longitudinal direction of the rail profile.

6. Lighting arrangement as claimed in claim 5, wherein the contact elements of the adapter unit are designed as punctiform contact elements including pin-like or pin-head-like contact elements.

7. Lighting arrangement as claimed in claim 5, wherein the assembly has a double-sided printed circuit board, wherein the strip-like contact elements are designed as tracks on one main surface of the printed circuit board, and wherein the double-sided printed circuit board is provided with light-generating devices on the other main surface thereof.

8. Lighting arrangement as claimed in claim 1, wherein the conductor device provided in the second region of the rail profile is further configured to provide a control signal, wherein the adapter unit is configured to receive the control signal from the conductor device and to interpret the received control signal, and wherein the adapter unit is configured to form, on the basis of the received control signal, an output signal to be communicated to the assembly for controlling the assembly and/or to control the assembly on the basis of the control signal, and wherein that the electrical coupling of the adapter unit and the assembly is configured for communicating the output signal to be communicated to the assembly and/or for controlling the assembly on the basis of the control signal.

9. Lighting arrangement as claimed in claim 8, wherein the assembly is designed as a lighting module and in that the lighting arrangement further has at least one further assembly designed as a lighting module, wherein the assembly and the further assembly are configured to further communicate the output signal, which is communicated by the adapter unit to the assembly for the control thereof, to the further assembly for the control thereof and/or the assembly and the further assembly can be controlled together according to a master-slave principle, wherein the further assembly as slave is subordinate to the assembly as master.

10. Lighting arrangement as claimed in claim 1, wherein the conductor device provided in the second region of the rail profile is further configured to provide a control signal, wherein the adapter unit is configured to pick up the control signal from the conductor device and relay it to the assembly.

11. Lighting arrangement as claimed in claim 1, wherein the first region is formed as a first region of the rail profile on a rear side when the lighting arrangement is in a usage state, wherein the rear-side first region is provided for accommodating, at least partially, an assembly designed as an indirect lighting module, the rear-side first region and the second region are formed adjacent to one another and are delimited from one another by a web of the rail profile, and the rail profile has a passage-opening in the region of the web, and in that the adapter unit has, on a side facing the web when the adapter unit is in a state inserted into the rail profile, a contacting section which can be introduced into the passage-opening in order to bring about the displaceable electrical coupling of the indirect lighting module to the adapter unit.

12. Lighting arrangement as claimed in claim 1, wherein the conductor device provided in the second region of the rail profile has at least one conductor which is provided in order to carry a control signal, and wherein the conductor device further has at least two conductors which each carry an electrical phase for the electrical supply to the lighting module or the lighting unit.

13. Lighting arrangement as claimed in claim 12, wherein the adapter unit is configured to couple the assembly to the at least one conductor carrying the control signal and to an optional one of the phases for the supply of power.

14. Lighting arrangement as claimed in claim 1, wherein the assembly can be mechanically coupled to the rail profile in the first region thereof in such a way that the assembly can be displaced relative to the rail profile in the state coupled to the rail profile.

15. A lighting arrangement, comprising:

an assembly,
 wherein the assembly is designed as a lighting module or
 wherein at least one lighting unit can be coupled to the assembly and/or can be accommodated at least partially by the assembly;

a rail profile having a first region for accommodating the assembly at least partially and having a second region, in which, along the rail profile, a conductor device for providing at least electrical energy is provided; and an adapter unit that can be accommodated in the second region of the rail profile at least partially and is configured to be electrically coupled to the conductor device in the second region, to receive electrical energy from the conductor device and to provide electrical energy to the assembly for supplying the lighting module or the lighting unit;

wherein the adapter unit and the assembly are configured for electrical coupling to each other in such a way that the assembly is displaceable relative to the adapter unit, which is inserted into the second region of the rail profile, along a longitudinal direction of the rail profile, and wherein the adapter unit has strip-like contact elements on a side facing the assembly when the adapter unit and the assembly are inserted into the rail profile, which strip-like contact elements can be brought into electrically conductive contact with contact elements of the assembly.

16. The lighting arrangement as claimed in claim 15, wherein the assembly is designed having a rail for coupling and/or accommodating the lighting units, at least partially.

17. The lighting arrangement as claimed in claim 16, wherein the rail of the assembly has a passage-opening in the region of a web of the rail facing the adapter unit when the adapter unit and the assembly are inserted into the rail profile, and wherein the assembly further comprises a connecting unit which can be inserted into the rail of the assembly, wherein the connecting unit has a contacting section and the contacting section can be inserted into the passage opening in order to bring about the electrical coupling of the assembly of the adapter unit.

18. The lighting arrangement as claimed in claim 17, wherein the connecting unit is configured for feeding at least electrical energy provided by the adapter unit into a conductor device of the rail of the assembly and wherein the connecting unit can be mechanically latched to the rail of the assembly or can be clipped into the rail of the assembly.

19. The lighting arrangement as claimed in claim 15, wherein the strip-like contact elements extend with the longitudinal direction thereof in the inserted state of the adapter component along a longitudinal direction of the rail profile.

20. The lighting arrangement as claimed in claim 15, wherein the contact elements of the assembly are designed as punctiform contact element having pin-like or pin-head-like contact elements.

21. The lighting arrangement as claimed in claim 15, wherein the lighting arrangement also has at least one further assembly which is designed as a lighting module or to which at least one lighting unit can be coupled and/or by means of which at least one lighting unit can be accommodated at least partially, wherein the assembly and the further assembly are configured for electrical coupling to one another in such a way that the further assembly can be supplied via the assembly at least with electrical energy provided by the adapter unit.

22. The lighting arrangement as claimed in claim 21, wherein the conductor device provided in the second region of the rail profile is further configured to provide a control signal, wherein the adapter unit is configured to pick up the control signal from the conductor device and relay the control signal to the assembly, and wherein the assembly and the further assembly are each designed having a rail for coupling and/or accommodating lighting units at least partially and can be coupled to one another in such a way that the control signal relayed to the assembly via the adapter unit can be relayed to the further assembly.

23. The lighting arrangement as claimed in claim 15, wherein the conductor device provided in the second region of the rail profile is further configured to provide a control signal, wherein the adapter unit is configured to pick up the control signal from the conductor device and relay the control signal to the assembly.

24. A lighting arrangement, comprising:

an assembly,
 wherein the assembly is designed as a lighting module or
 wherein at least one lighting unit can be coupled to the assembly and/or can be accommodated at least partially by the assembly;

a rail profile having a first region for accommodating the assembly at least partially and having a second region, in which, along the rail profile, a conductor device for providing at least electrical energy is provided; and an adapter unit which can be accommodated in the second region of the rail profile at least partially and is configured to be electrically coupled to the conductor device in the second region, to receive electrical energy from the conductor device and to provide electrical energy to the assembly for supplying the lighting module or the lighting unit;

wherein the adapter unit and the assembly are configured for electrical coupling to each other in such a way that the assembly is displaceable relative to the adapter unit, which is inserted into the second region of the rail profile, along a longitudinal direction of the rail profile, and wherein the lighting module or the lighting unit can be operated for providing direct or indirect lighting by means of electrical energy at a first electrical voltage, the conductor device is provided in the second region for providing the electrical energy at a second electrical voltage which is higher than the first electrical voltage, and the adapter unit has a converter and is configured to receive electrical energy from the conductor device in the second region and to provide the electrical energy for supplying the lighting module or the lighting unit at the first electrical voltage.

* * * * *